US011622302B2

(12) United States Patent
Ozturk et al.

(10) Patent No.: US 11,622,302 B2
(45) Date of Patent: Apr. 4, 2023

(54) PACKET DATA CONVERGENCE PROTOCOL (PDCP) DUPLICATION IN DUAL-ACTIVE-PROTOCOL STACK (DAPS) HANDOVER (HO)

(71) Applicant: QUALCOMM Incorporated, San Diego, CA (US)

(72) Inventors: Ozcan Ozturk, San Diego, CA (US); Punyaslok Purkayastha, San Diego, CA (US); Karthika Paladugu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 204 days.

(21) Appl. No.: 17/219,657

(22) Filed: Mar. 31, 2021

(65) Prior Publication Data

US 2021/0314831 A1 Oct. 7, 2021

Related U.S. Application Data

(60) Provisional application No. 63/003,760, filed on Apr. 1, 2020.

(51) Int. Cl.
*H04W 36/00* (2009.01)
*H04W 80/02* (2009.01)
*H04W 8/24* (2009.01)
*H04W 28/06* (2009.01)

(52) U.S. Cl.
CPC ........ *H04W 36/0069* (2018.08); *H04W 8/24* (2013.01); *H04W 36/0058* (2018.08); *H04W 80/02* (2013.01); *H04W 28/06* (2013.01)

(58) Field of Classification Search
CPC ............... H04W 36/0069; H04W 8/24; H04W 36/0058; H04W 80/02; H04W 28/06; H04W 36/18
See application file for complete search history.

(56) References Cited

U.S. PATENT DOCUMENTS

| 2020/0022035 | A1* | 1/2020 | Kadiri | H04W 36/0072 |
| 2020/0367101 | A1* | 11/2020 | Paladugu | H04W 36/0011 |
| 2021/0105671 | A1* | 4/2021 | Van Der Velde | H04W 36/18 |
| 2021/0282002 | A1* | 9/2021 | Sèbire | H04W 36/026 |

* cited by examiner

*Primary Examiner* — Afshawn M Towfighi
(74) *Attorney, Agent, or Firm* — Patterson+ Sheridan, L.L.P.; Dang M. Vo

(57) ABSTRACT

Aspects of the present disclosure relate to wireless communications, and more particularly, to techniques for maintaining simultaneous connection with a network in dual-active protocol stack (DAPS) handover (HO), such as, for example, in packet data convergence protocol (PDCP) duplication applications that require a user equipment (UE) to maintain up to four simultaneous connections with the network, such as in an multi-radio access transfer (RAT) dual connectivity (MR-DC) to MR-DC HO. In some embodiments, the UE is configured during various phases of a DAPS HO. In some other embodiments, the UE may be configured for multi-TRP operations.

30 Claims, 16 Drawing Sheets

PACKET DATA CONVERGENCE PROTOCOL (PDCP) DUPLICATION IN DUAL-ACTIVE-PROTOCOL STACK (DAPS) HANDOVER (HO)

CROSS-REFERENCE TO RELATED APPLICATION

This application claims benefit of and priority to U.S. Provisional Patent Application No. 63/003,760, filed Apr. 1, 2020, which is hereby incorporated by reference in its entirety.

BACKGROUND

Field of the Disclosure

Aspects of the present disclosure relate to wireless communications, and more particularly, to techniques for maintaining network connections during a dual-active protocol stack (DAPS) handover (HO).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In a long term evolution (LTE) or LTE Advanced (LTE-A) network, a set of one or more BSs may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a central unit, may define an access node (e.g., a new radio base station (NR BS), a new radio node-B (NR NB), a network node, 5G NB, gNB, gNodeB, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even0 global level. An example of an emerging telecommunication standard is new radio (NR), for example, 5G radio access. NR is a set of enhancements to the LTE mobile standard promulgated by 3rd generation partnership project (3GPP). It is designed to better support mobile broadband Internet access by improving spectral efficiency, lowering costs, improving services, making use of new spectrum, and better integrating with other open standards using OFDMA with a cyclic prefix (CP) on the DL and on the UL as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved techniques for maintaining network connections during a dual-active protocol stack (DAPS) handover (HO).

Certain aspects of this disclosure provide a method for wireless communication by a target node. The method may include receiving, from a source node, a HO request message for a DAPS HO of a user equipment (UE) from the source node to the target node. The method may also include determining a packet data convergence protocol (PDCP) duplication configuration for a completion phase of the DAPS HO, taking into account one or more capabilities of the UE related to PDCP duplication and a current duplication configuration of the UE. The method may further include sending the source node a response to the HO request including an indication of the PDCP duplication configuration for the completion phase of the DAPS HO.

Certain aspects of the present disclosure provide a method for wireless communication by a source node. The method generally includes sending, to a target node, a HO request message for a DAPS HO of a UE from the source node to the target node; receiving, from the target node, a response to the HO request message that includes a PDCP duplication configuration for a completion phase of the DAPS HO that takes into account one or more capabilities of the UE related to PDCP duplication and a current duplication configuration of the UE; and sending the UE a reconfiguration message including an indication of the PDCP duplication configuration for the completion phase of the DAPS HO.

Certain aspects of the present disclosure provide a method for wireless communication by a (UE. The method generally includes providing an indication of the UE related to PDCP duplication; receiving, from a source node, a reconfiguration message for a DAPS HO of the UE from the source node to a target node, wherein the reconfiguration message indicates a PDCP duplication configuration for a completion phase of the DAPS HO that takes into account one or more capabilities of the UE related to PDCP duplication and a current duplication configuration of the UE; and performing a HO to the target node based on the PDCP duplication configuration for the completion phase of the DAPS HO included in the reconfiguration message.

Certain aspects provide an apparatus for wireless communications. The apparatus generally includes a processor configured to: receive, from a source node, a HO request message for a DAPS HO of a UE from the source node to the target node; determine a PDCP duplication configuration for a completion phase of the DAPS HO, taking into account one or more capabilities of the UE related to PDCP duplication and a current PDCP duplication configuration of the UE; and send the source node a response to the HO request including an indication of the PDCP duplication configuration for the completion phase of the DAPS HO.

Certain aspects provide an apparatus for wireless communications. The apparatus generally includes a processor configured to send, to a target node, a HO request message for a dual active protocol stack (DAPS) HO of a user equipment (UE) from the source node to the target node; receive, from the target node, a response to the HO request message that includes a packet data convergence protocol (PDCP) duplication configuration for a completion phase of the DAPS HO that takes into account one or more capabilities of the UE related to packet data convergence protocol (PDCP) duplication and a current PDCP duplication configuration of the UE; and send the UE a reconfiguration message including an indication of the PDCP duplication configuration for the completion phase of the DAPS HO as received from the target node.

Certain aspects provide an apparatus for wireless communications. The apparatus generally includes a processor configured to provide an indication of the UE capabilities related to packet data convergence protocol (PDCP) duplication; receive, from a source node, a reconfiguration message for a dual active protocol stack (DAPS) HO of the UE from the source node to a target node, wherein the reconfiguration message indicates a packet data convergence protocol (PDCP) duplication configuration for a completion phase of the DAPS HO that takes into account one or more capabilities of the UE related to PDCP duplication and a current PDCP duplication configuration of the UE; and perform a HO to the target node based on the PDCP duplication configuration for the completion phase of the DAPS HO included in the reconfiguration message.

Certain aspects provide an apparatus for wireless communications. The apparatus generally includes means for receiving, from a source node, a HO request message for a DAPS HO of a UE from the source node to the target node; means for determining a PDCP duplication configuration for a completion phase of the DAPS HO, taking into account one or more capabilities of the UE related to PDCP duplication and a current PDCP duplication configuration of the UE; and means for sending the source node a response to the HO request including an indication of the PDCP duplication configuration for the completion phase of the DAPS HO.

Certain aspects provide an apparatus for wireless communications. The apparatus generally includes means for sending, to a target node, a HO request message for a DAPS HO of a UE from the source node to the target node; means for receiving, from the target node, a response to the HO request message that includes a PDCP duplication configuration for a completion phase of the DAPS HO that takes into account one or more capabilities of the UE related to PDCP duplication and a current PDCP duplication configuration of the UE; and means for sending the UE a reconfiguration message including an indication of the PDCP duplication configuration for the completion phase of the DAPS HO as received from the target node.

Certain aspects provide an apparatus for wireless communications. The apparatus generally includes means for providing an indication of the UE capabilities related to PDCP duplication; means for receiving, from a source node, a reconfiguration message for a DAPS HO of the UE from the source node to a target node, wherein the reconfiguration message indicates a PDCP duplication configuration for a completion phase of the DAPS HO that takes into account one or more capabilities of the UE related to PDCP duplication and a current PDCP duplication configuration of the UE; and means for performing a HO to the target node based on the PDCP duplication configuration for the completion phase of the DAPS HO included in the reconfiguration message.

Certain aspects provide a computer-readable medium for wireless communications. The computer-readable medium includes instructions that, when executed by a processing system, cause the processing system to perform operations generally including receiving, from a source node, a HO request message for a DAPS HO of a UE from the source node to the target node; determining a PDCP duplication configuration for a completion phase of the DAPS HO, taking into account one or more capabilities of the UE related to PDCP duplication and a current PDCP duplication configuration of the UE; and sending the source node a response to the HO request including an indication of the PDCP duplication configuration for the completion phase of the DAPS HO.

Certain aspects provide a computer-readable medium for wireless communications. The computer-readable medium includes instructions that, when executed by a processing system, cause the processing system to perform operations generally including sending, to a target node, a HO request message for a DAPS HO of a UE from the source node to the target node; receiving, from the target node, a response to the HO request message that includes a PDCP duplication configuration for a completion phase of the DAPS HO that takes into account one or more capabilities of the UE related to PDCP duplication and a current PDCP duplication configuration of the UE; and sending the UE a reconfiguration message including an indication of the PDCP duplication configuration for the completion phase of the DAPS HO as received from the target node.

Certain aspects provide a computer-readable medium for wireless communications. The computer-readable medium includes instructions that, when executed by a processing system, cause the processing system to perform operations generally including providing an indication of the UE capabilities related to PDCP duplication; receiving, from a source node, a reconfiguration message for a DAPS HO of the UE from the source node to a target node, wherein the reconfiguration message indicates a PDCP duplication configuration for a completion phase of the DAPS HO that takes into account one or more capabilities of the UE related to PDCP duplication and a current PDCP duplication configuration of the UE; and performing a HO to the target node based on the PDCP duplication configuration for the completion phase of the DAPS HO included in the reconfiguration message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
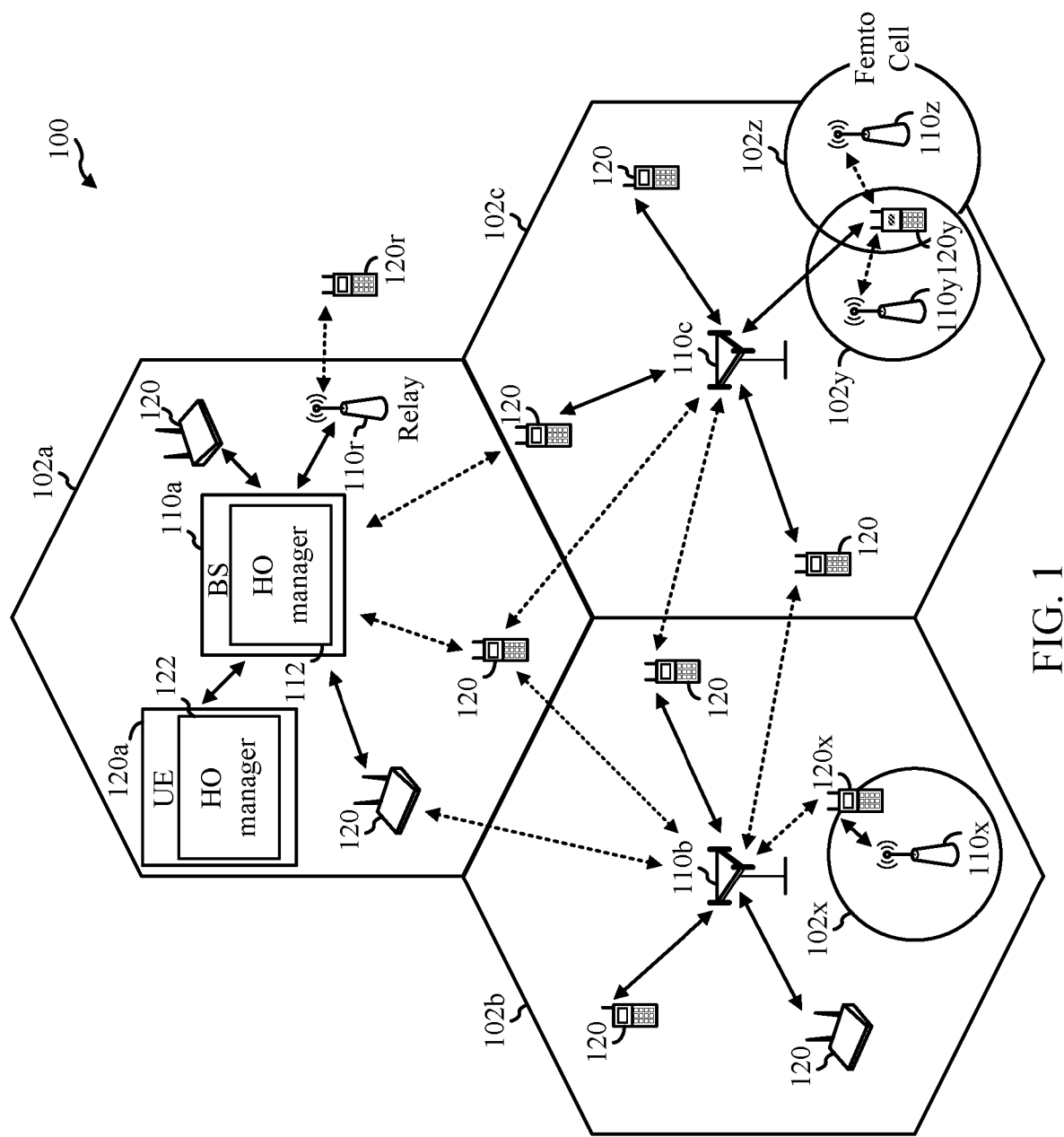
FIG. 1 is a block diagram conceptually illustrating an example wireless communication network, in accordance with certain aspects of the present disclosure.

Aspects of the present disclosure provide apparatus, methods, processing systems, and computer readable mediums for providing support to a user equipment (UE) capable of packet data convergence protocol (PDCP) duplication in dual-active protocol stack (DAPS) handover (HO). A PDCP layer handles a data transfer that includes, for example, user data, a header compression, a sequence numbering, a duplication detection, a packet duplication, among others.

In certain aspects, a technique is implemented to maintain simultaneous connection with a network in DAPS HO, such as, for example, in PDCP duplication applications that require a UE to maintain up to four simultaneous connections with the network, such as in a multi-radio access technology (RAT) dual connectivity (MR-DC) to MR-DC HO. In some cases, the UE may be configured during various phases of the DAPS HO. In some cases, the UE may be configured for multi-transmission reception point (TRP) operations.

The subject matter described herein may pertain to communication standards such as, for example, 3GPP, IEEE, PCI-E, JEDEC, MIPI, USB-IF, etc. More specifically, the subject matter described herein pertains to specifications of TS 38.300 and TS 38.331 of 3GPP. Someone having ordinary skill in the art would understand this specification using these standard related backgrounds.

The following description provides examples of techniques for maintaining network connections during a DAPS HO in communication systems. A DAPS handover generally refers to a handover procedure designed to decrease mobility interruption time, which refers to the time a UE is unable to transmit or receive data while performing a handover. A DAPS HO may eliminate or reduce this interruption time by continuing to transmit/receive in the source cell after receiving the handover request and also by using simultaneous reception of user data from both the source and target cells until user data is switched to the target cell after completion of the random access procedure. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective QoS requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communication System

FIG. 1 illustrates an example wireless communication network 100 in which aspects of the present disclosure may be performed. For example, the wireless communication network 100 may include one or more base stations (BSs) 110 and/or one or more user equipments (UEs) 120 configured to execute techniques for maintaining network connections during a dual-active protocol stack (DAPS) handover (HO). As shown in FIG. 1, a UE 120a includes a HO manager 122 that may be configured to perform operations 1000 of FIG. 10. ABS 110a includes a HO manager 112 that may be configured to perform target node operations 800 of FIG. 8 and/or source node operations 900 of FIG. 9 described below.

The wireless communication network 100 may be a new radio (NR) system (e.g., a 5th generation (5G) NR network).

As shown in FIG. 1, the wireless communication network 100 may be in communication with a core network (CN) 132. The CN 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

The BS 110 may provide communication coverage for a particular geographic area, sometimes referred to as a "cell", which may be stationary or may move according to the location of a mobile BS 110. In some examples, multiple BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between wireless devices.

A network controller 130 may be in communication with a set of BSs 110 and provide coordination and control for these BSs 110 (e.g., via a backhaul). In aspects, the network controller 130 may be in communication with the CN 132 (e.g., a 5G core network (5GC)), which provides various network functions such as access and mobility management, session management, user plane function, policy control function, authentication server function, unified data management, application function, network exposure function, network repository function, network slice selection function, etc.

HOHOFIG. 2 illustrates an example logical architecture of a distributed radio access network (RAN) 200, which may be implemented in the wireless communication network 100 illustrated in FIG. 1. A 5G access node 206 may include an access node controller (ANC) 202. The ANC may be a central unit (CU) of the distributed RAN 200. A backhaul interface to a next generation core network (NG-CN) 204 may terminate at the ANC 202. The backhaul interface to neighboring next generation access nodes (NG ANs) 210 may terminate at the ANC 202. The ANC 202 may include one or more transmission reception points (TRPs) 208 (which may also be referred to as BSs, NR BSs, Node Bs, 5G NBs, APs, or some other term). As described above, a TRP 208 may be used interchangeably with a "cell."

The TRPs 208 may be a DU. The TRPs 208 may be connected to one ANC (ANC 202) or more than one ANC (not illustrated). For example, for RAN sharing, radio as a service (RaaS), and service specific AND deployments, the TRP 208 may be connected to more than one ANC. The TRP 208 may include one or more antenna ports. The TRPs 208 may be configured to individually (e.g., dynamic selection) or jointly (e.g., joint transmission) serve traffic to a UE.

The local architecture of the distributed RAN 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the NG-AN 210 may support dual connectivity with NR. The NG-AN 210 may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture of the distributed RAN 200. As will be described in more detail with reference to FIG. 5, a radio resource control (RRC) layer, a packet data convergence protocol (PDCP) layer, a radio link control (RLC) layer, a medium access control (MAC) layer, and a physical (PHY) layer may be adaptably placed at the DU or CU (e.g., the TRP 208 or the ANC 202, respectively). According to certain aspects, a BS may include a CU (e.g., the ANC 202) and/or one or more DUs (e.g., one or more TRPs 208).

Figure 3:
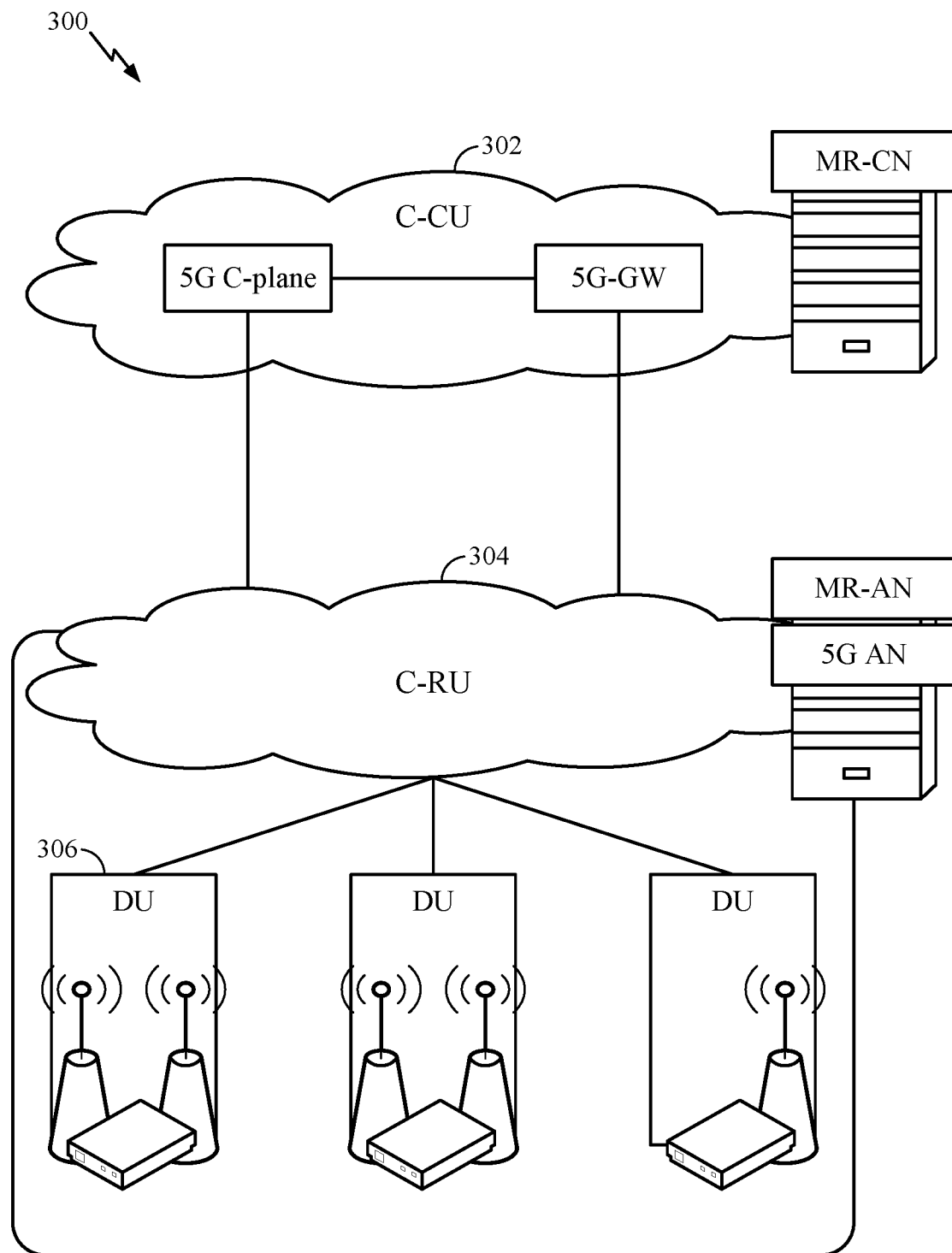
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. The C-CU 302 functionality may be off-loaded (e.g., to advanced wireless services (AWS)), to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (edge node (EN), an edge unit (EU), a radio head (RH), a smart radio head (SRH), or the like). The DU 306 may be located at edges of a network with a radio frequency (RF) functionality.

Figure 4:
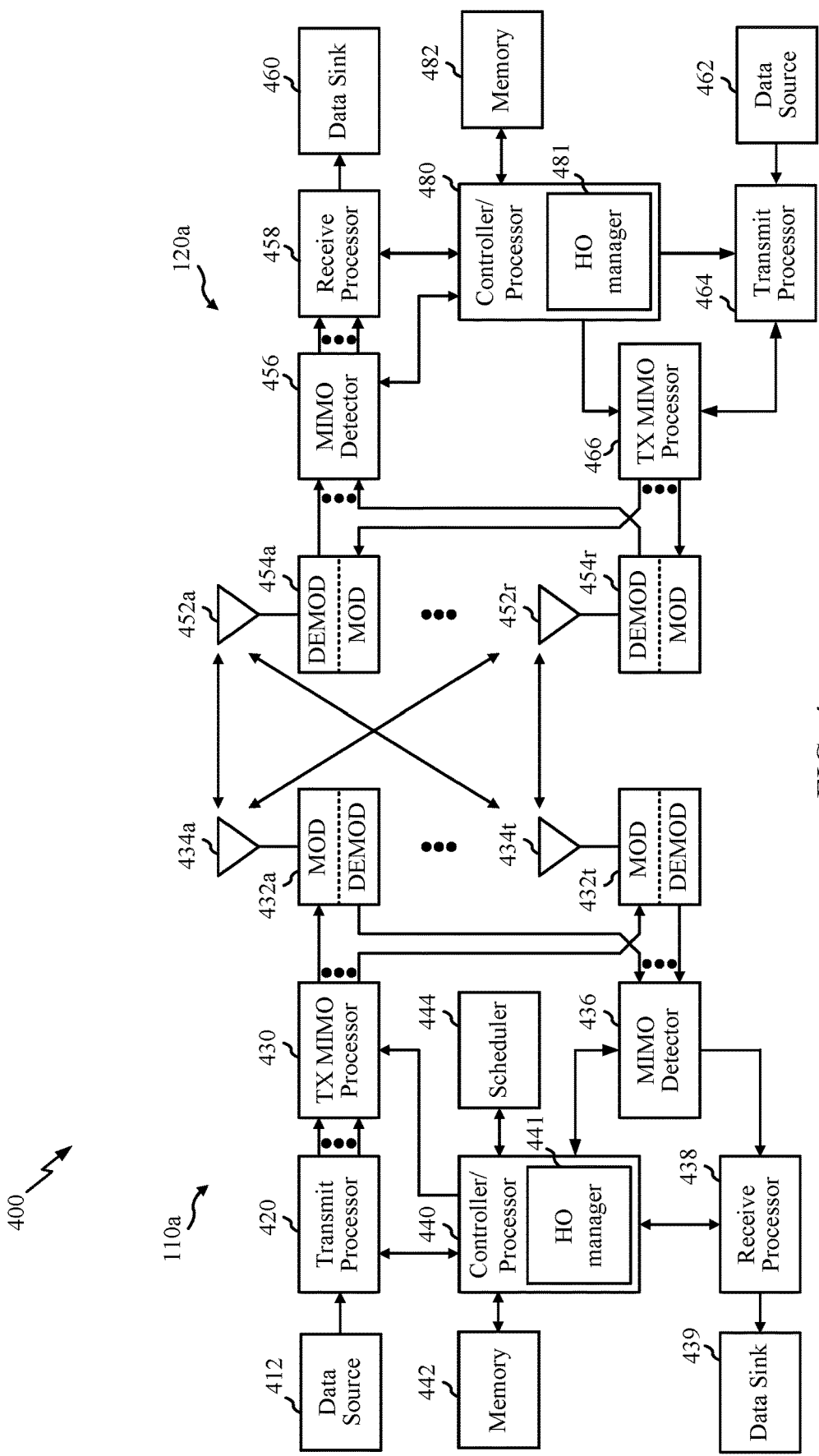
FIG. 4 is a block diagram conceptually illustrating a design of an example base station (BS) and user equipment (UE), in accordance with certain aspects of the present disclosure.

FIG. 4 illustrates example components of a BS 110a and a UE 120a (e.g., in the wireless communication network 100 of FIG. 1).

At the BS 110a, a transmit processor 420 may receive data from a data source 412 and control information from a controller/processor 440. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 420 may process (e.g., encode and symbol map) the data and control information to obtain data symbols and control symbols, respectively. The processor 420 may also generate reference symbols such as for a primary synchronization signal (PSS), a secondary synchronization signal (SSS), and a channel state information reference signal (CSI-RS). A transmit multiple-input multiple-output (MIMO) processor 430 may perform spatial processing (e.g., precoding) on the data symbols, the control symbols, and/or the reference symbols, if applicable, and may provide output symbol streams to modulators (MODs) in transceivers 432a-432t. Each MOD in transceivers 432a-432t may process a respective output symbol stream (e.g., for orthogonal frequency division multiplexing (OFDM), etc.) to obtain an output sample stream. Each MOD in transceivers 432a-432t may further process (e.g., convert to analog, amplify, filter, and upconvert) the output sample stream to obtain a downlink (DL) signal. The DL signals from the MODs in transceivers 432a-432t may be transmitted via antennas 434a through 434t, respectively.

At the UE 120a, antennas 452a-452r may receive DL signals from the BS 110a and may provide received signals to demodulators (DEMODs) in transceivers 454a-454r, respectively. Each DEMOD in the transceiver 454 may condition (e.g., filter, amplify, downconvert, and digitize) a respective received signal to obtain input samples. Each DEMOD in the transceiver 454 may further process the input samples (e.g., for OFDM, etc.) to obtain received symbols. A MIMO detector 456 may obtain received symbols from all the DEMODs in the transceivers 454a-454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink (UL), at the UE 120a, a transmit processor 464 may receive and process data (e.g., for a PUSCH) from a data source 462 and control information (e.g., for a physical uplink control channel (PUCCH) from the controller/processor 480. The transmit processor 464 may also generate reference symbols for a reference signal. The symbols from the transmit processor 464 may be precoded by a TX MIMO processor 466 if applicable, further processed by the MODs in transceivers 454a-454r (e.g., for SC-FDM, etc.), and transmitted to the BS 110a. At the BS 110a, the UL signals from the UE 120a may be received by the antennas 434, processed by the DEMODs in transceivers 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

Memories 442 and 482 may store data and program codes for the BS 110a and the UE 120a, respectively. A scheduler 444 may schedule the UE 120a for data transmission on a DL and/or an UL.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein. For example, as shown in FIG. 4, the controller/processor 440 of the BS 110a has a HO manager 441 that may be configured to perform the operations illustrated in FIG. 8 and FIG. 9, as well as other operations disclosed herein. As shown in FIG. 4, the controller/processor 480 of the UE 120a has a HO manager 481 that may be configured to perform the operations illustrated in FIG. 10, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 5:
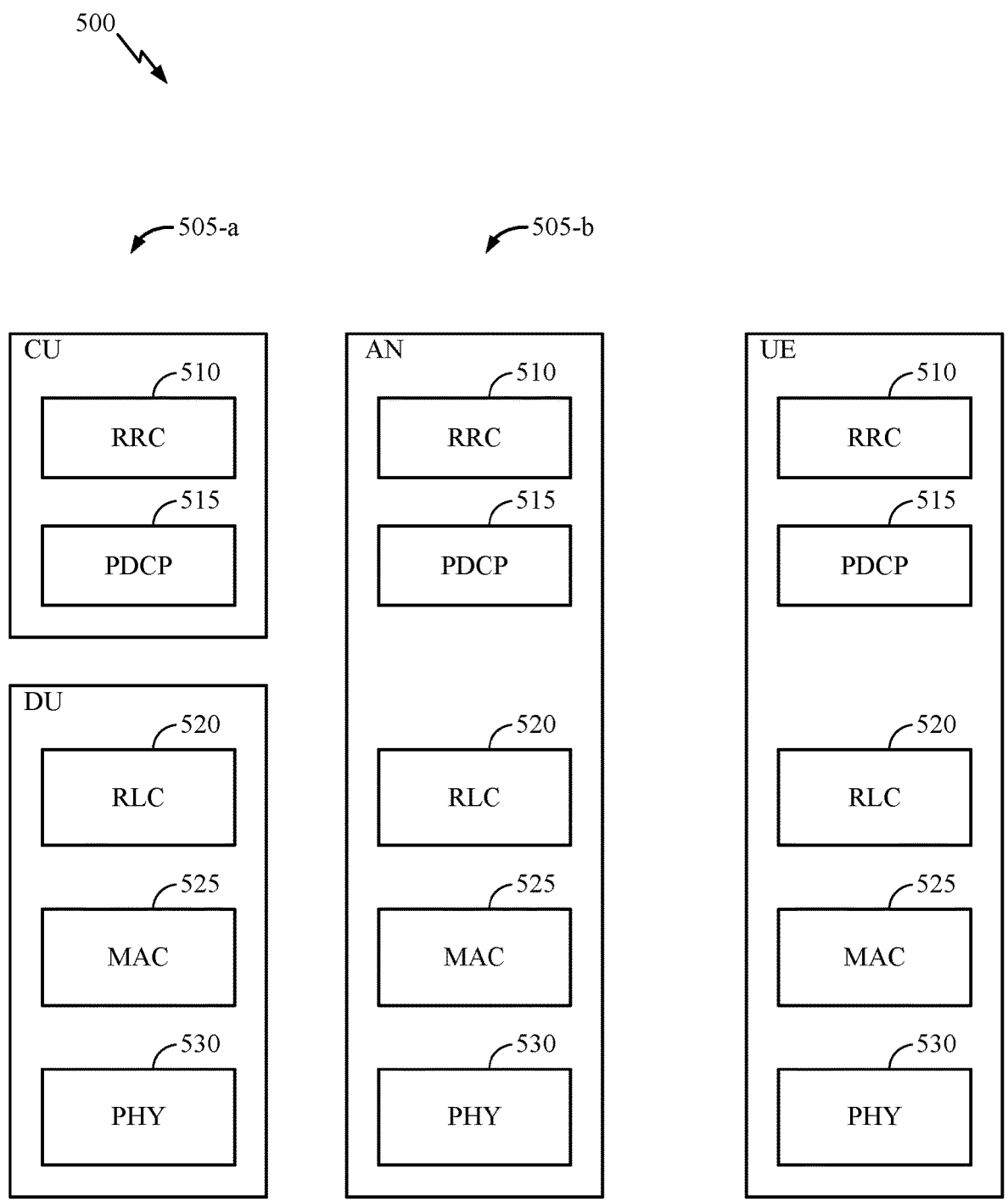
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. The diagram 500 illustrates a communications protocol stack including a RRC layer 510, a PDCP layer 515, a RLC layer 520, a MAC layer 525, and a PHY layer 530. The layers of the communications protocol stack may be implemented as separate modules of software, portions of a processor or ASIC, portions of non-collocated devices connected by a communications link, or various combinations thereof. Collocated and non-collocated implementations may be used, for example, in the communications protocol stack for a network access device (e.g., ANs, CUs, and/or DUs) or a UE.

Figure 2:
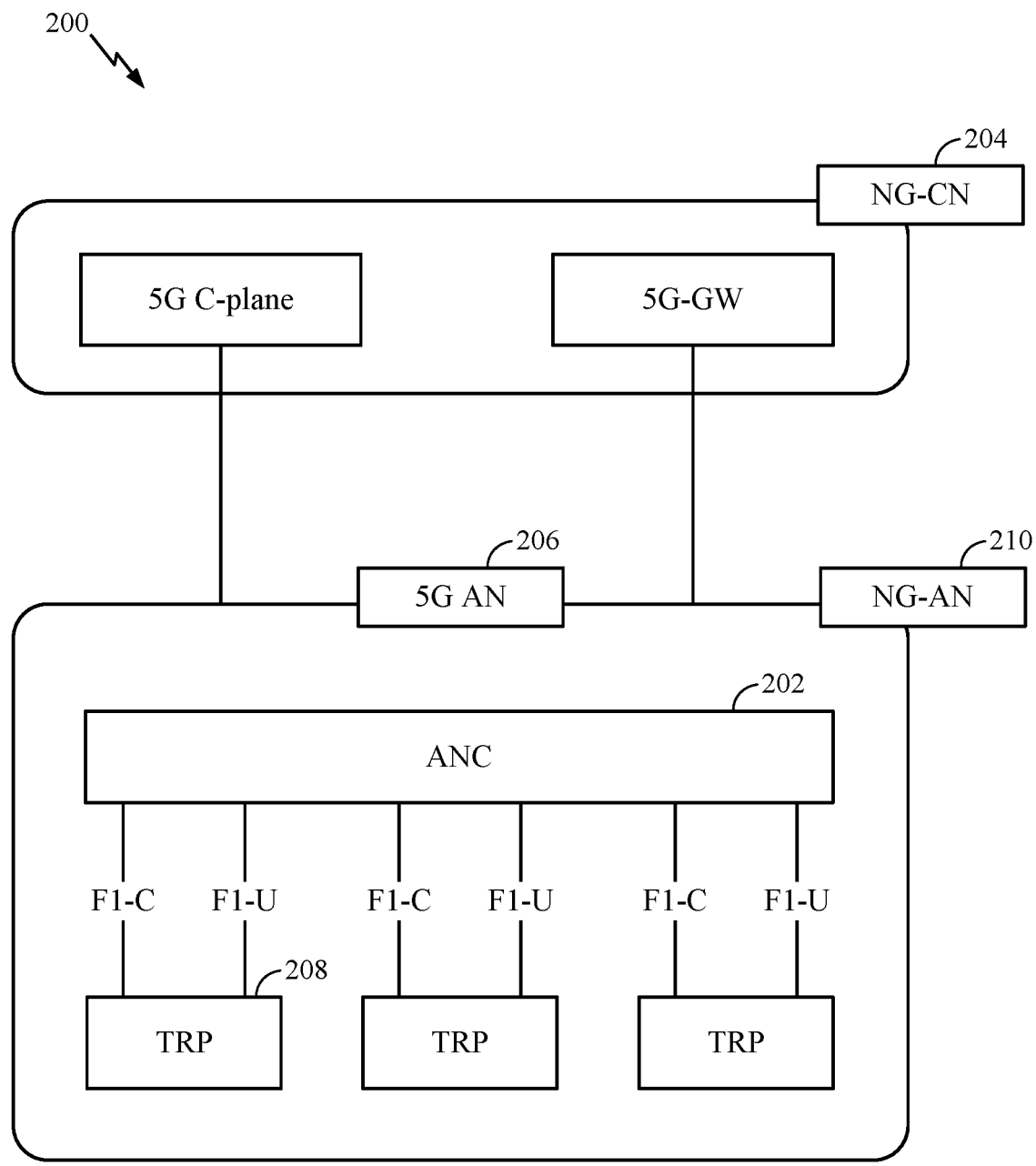
FIG. 2 is a block diagram illustrating an example logical architecture of a distributed radio access network (RAN), in accordance with certain aspects of the present disclosure.

A first option 505-a shows a split implementation of the communications protocol stack, in which implementation of the communications protocol stack is split between a centralized network access device (e.g., an ANC 202 in FIG. 2) and a distributed network access device (e.g., DU 208 in FIG. 2). In the first option 505-a, the RRC layer 510 and the PDCP layer 515 may be implemented by the CU, and the RLC layer 520, the MAC layer 525, and the PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of the communications protocol stack, in which the communications protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire communications protocol stack (e.g., the RRC layer 510, the PDCP layer 515, the RLC layer 520, the MAC layer 525, and the PHY layer 530).

Figure 6:
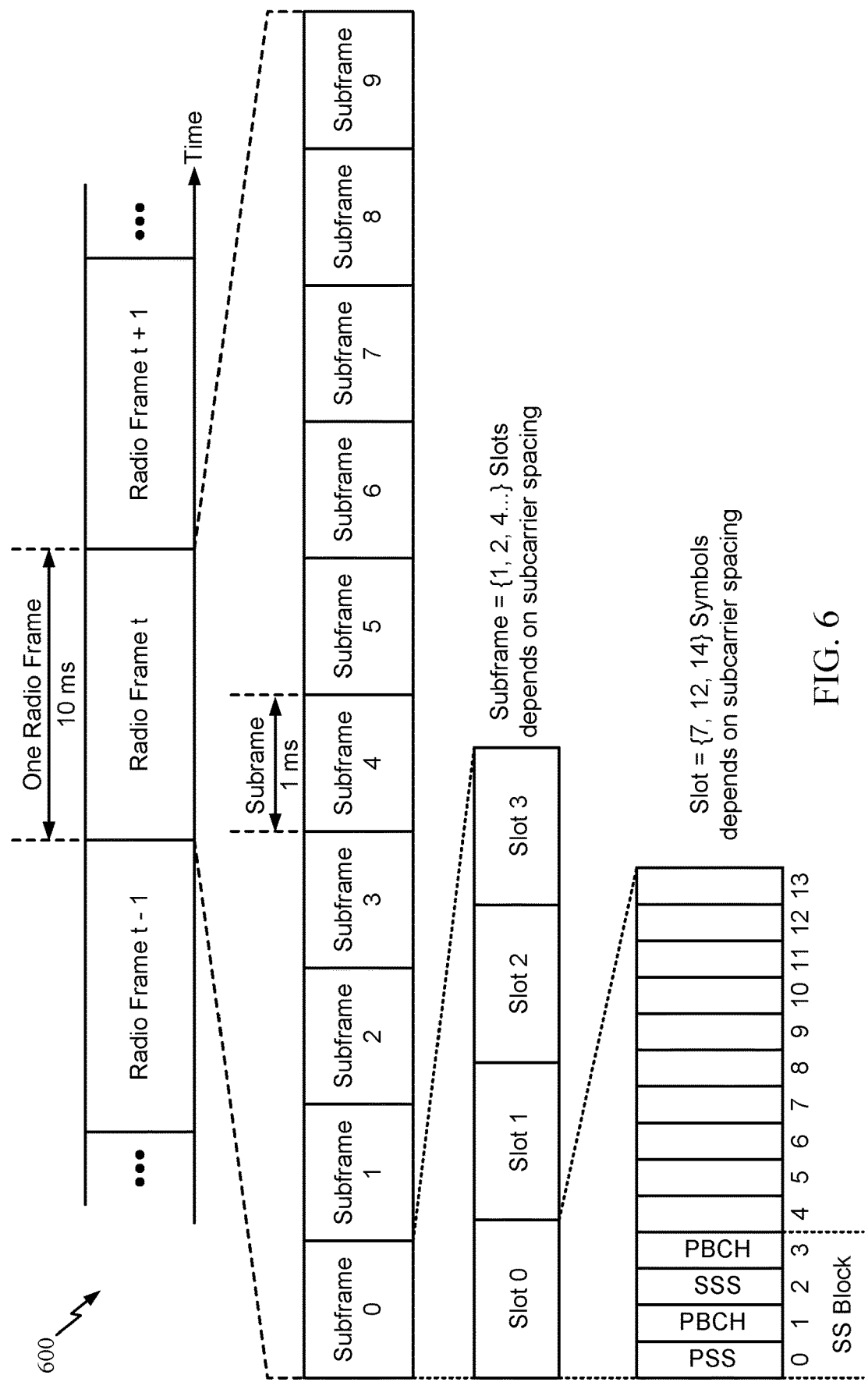
FIG. 6 illustrates an example of a frame format for certain wireless communication systems (e.g., new radio (NR)), in accordance with certain aspects of the present disclosure.

FIG. 6 is a diagram showing an example of a frame format 600 for NR. A transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., a DL, a UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example PDCP Duplication in DAPS HO

Aspects of the present disclosure provide improved techniques for packet data convergence protocol (PDCP) duplication in a dual active protocol stack (DAPS) handover (HO), and more particularly, provide a user equipment (UE) configuration to match or not exceed the UE's PDCP duplications capabilities.

In data communication that requires high reliability, such as in ultra-reliable low latency communications (URLLC), the PDCP duplication may be used in an effort to help meet such high reliability requirements. During the DAPS HO, a source (e.g., a source node, which may include a source master node and a source secondary node of a multi radio dual connectivity (MR-DC) configuration) connected with the UE sends requests to a target (e.g., a target node, which may include a target master node and a target secondary node of an MR-DC configuration) in order to have a connection handed over to the target.

In existing PDCP duplication DAPS HO operations, the requests sent by the source do not indicate radio link control (RLC) capabilities of the UE. As such, the target may not fully utilize the available RLCs in the UE or may send configurations that exceed the RLC capabilities of the UE, causing inefficient HO or errors. Therefore, the subject matter described herein provides methods and systems for configuring the UE, the source, and the target to correctly identify the PDCP duplication capabilities of the UE and maintain connections with the PDCP duplication when available.

A network may configure the PDCP duplication for certain radio bearers (RBs) based on quality of service (QoS) requirements in two phases: (1) a DAPS HO execution phase when the source requests the HO from the target, and (2) a DAPS HO completion phase when the target completes and confirms the HO (e.g., after the UE RACHes on the target). In both the DAPS HO execution phase and the DAPS HO completion phase, the network configures at least these two aspects for the UE: (1) whether the PDCP duplication is enabled or disabled for the RB; and (2) when the PDCP duplication is enabled, the network configures and activates RLC entities for the RB. Unlike in existing or conventional network systems, the disclosed target may provide configuration to the UE during the DAPS HO completion phase, for example, the target master node may configure the UE during an MR-DC HO, such as, for example, by using a radio resource control (RRC) reconfiguration message.

In some cases, a network may or may not support carrier aggregation (CA) or dual connectivity (DC) duplication, unlike the existing network that leaves the issue unaddressed, the disclosed source and target may: determine the configuration for the UE based on the UE's actual network capabilities, and configure and activate the UE accordingly.

Figure 7:
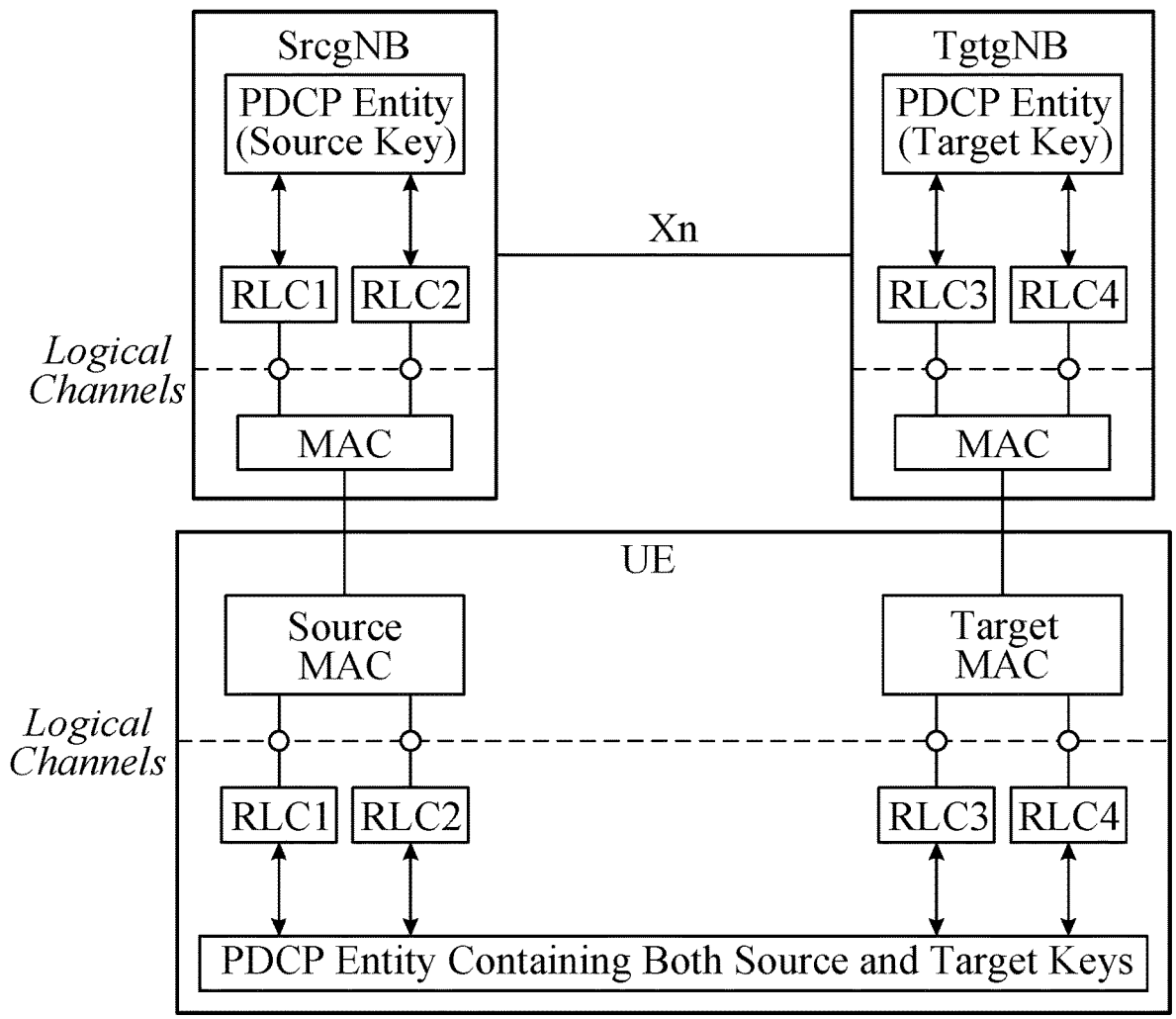
FIG. 7 illustrates an example packet data convergence protocol (PDCP) duplication in a dual-active protocol stack (DAPS) handover (HO) scenario, in accordance with certain aspects of the present disclosure.

FIG. 7 illustrates an example PDCP duplication configuration for an RB for a HO completion phase of a DAPS HO, in accordance with certain aspects of the present disclosure. The example in FIG. 7 assumes that maximum RLC entities that can be configured or activated is 4. If a source connection has 2 RLC entities for the RB (RLC1 and RLC2 in this example), a target connection can have a maximum of 2 RLC entities configured (RLC3 and RLC4 in this example). A common PDCP entity at a UE (e.g., such as the UE 120*a* in the wireless communication network 100 of FIG. 1) may have a common reordering entity.

Aspects of the present disclosure may help ensure that a target node does not exceed a UE's PDCP duplication capability when configuring a UE for the completion phase of a DAPS HO. The UE's PDCP duplication capability may include, whether the PDCP duplication is supported for a data radio bearer (DRB) or a signal radio bearer (SRB). For example, the UE may provide capabilities related to existing IE pdcp-DuplicationMCG-OrSCG-DRB in TS 38.331 of Release 15 by 3GPP. The UE capabilities may further include whether the PDCP duplication is supported for a split SRB or DRB. For example, the UE may provide capabilities related to existing IE pdcp-DuplicationSplit-DRB in TS 38.331 of Release 15 by 3GPP. The UE capabilities may also include enhanced PDCP duplication support, for example, up to four configured RLC entities per duplicated RB. In addition, the UE capabilities may include a maximum number of DRBs that may be duplicated, and a maximum number of activated RLC entities per duplicated RB.

According to certain aspects of the present disclosure, in order to avoid the target node configuring or activating more RLC entities for the duplicated RB than the number of RLC entities allowed by the UE, the source node may provide to the target node the number of RLC entities that are currently configured in connection with the UE. The number of RLC entities that are currently configured in connection with the UE may be more than or equal to the number of RLC entities that have been activated for each duplicated RB.

Figure 8:
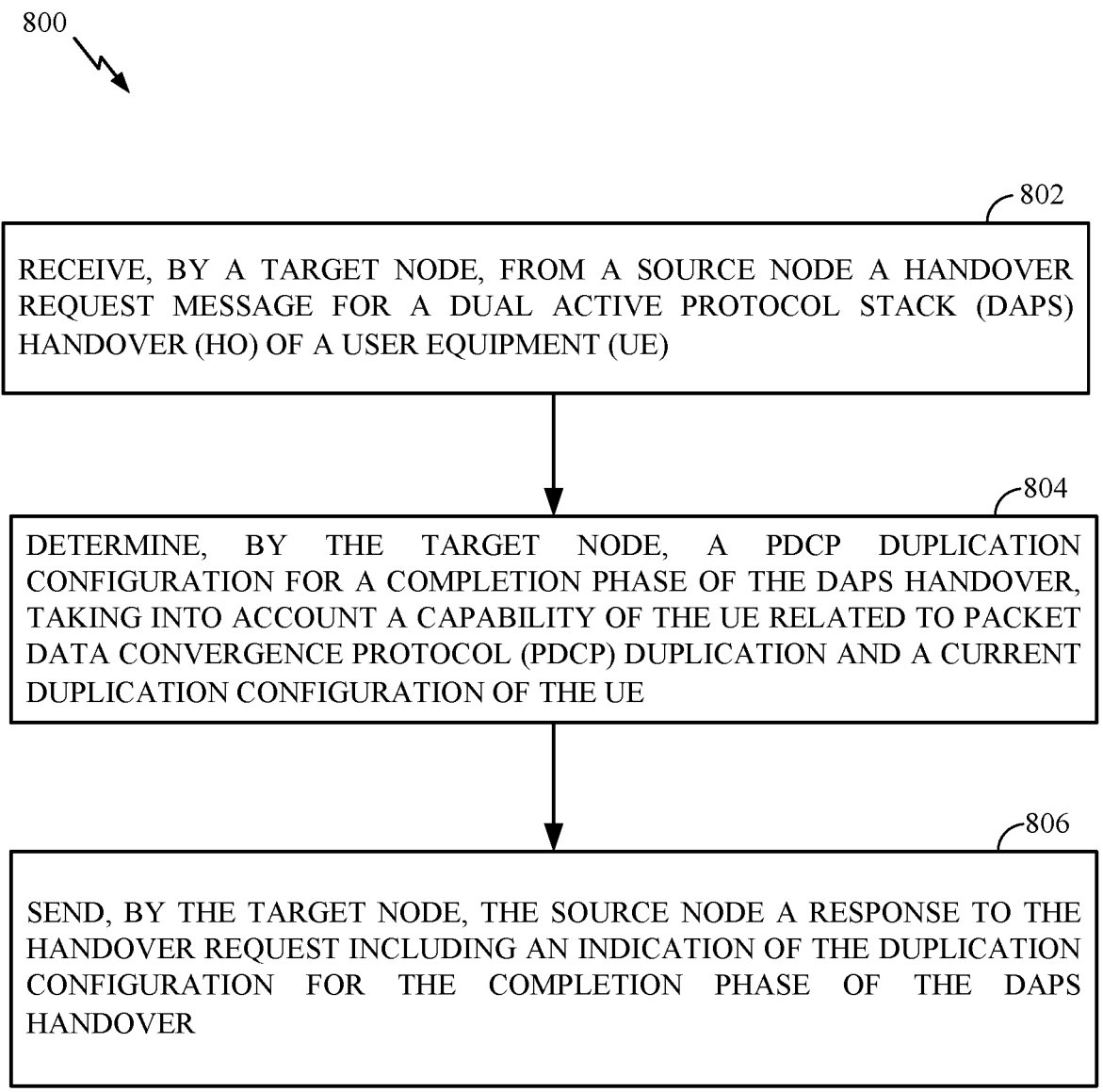
FIG. 8 is a flow diagram illustrating example operations for wireless communications by a target node, in accordance with certain aspects of the present disclosure.

FIG. 8 is a flow diagram illustrating example operations 800 for wireless communication, in accordance with certain aspects of the present disclosure. The operations 800 may be performed, for example, by a target node (e.g., such as the BS 110*a* in the wireless communication network 100 of FIG. 1). The operations 800 may be implemented as software components that are executed and run on one or more processors (e.g., the controller/processor 440 of FIG. 4). Further, the transmission and reception of signals by the target node in the operations 800 may be enabled, for example, by one or more antennas (e.g., the antennas 434 of FIG. 4). In certain aspects, the transmission and/or reception of signals by the target node may be implemented via a bus interface of one or more processors (e.g., the controller/processor 440) obtaining and/or outputting signals.

The operations 800 may begin, at 802, by receiving, from a source node, a HO request message for a DAPS HO of a UE from the source node to the target node.

At 804, the target node determines a PDCP duplication configuration for a completion phase of the DAPS HO, taking into account one or more capabilities of the UE related to PDCP duplication and a current duplication configuration of the UE.

At 806, the target node sends the source node a response to the HO request, which may include an indication of the PDCP duplication configuration for the completion phase of the DAPS HO.

Figure 9:
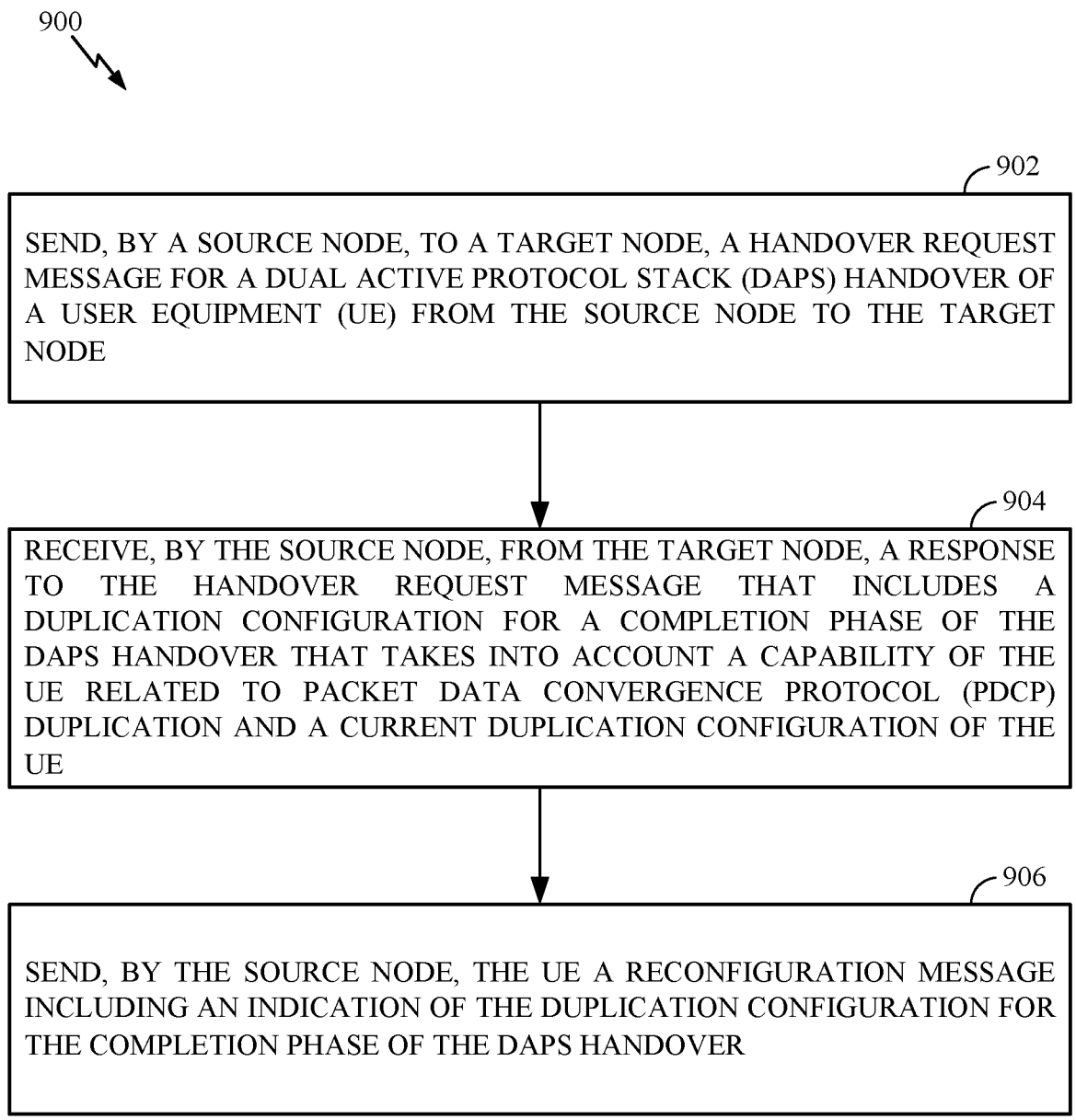
FIG. 9 is a flow diagram illustrating example operations for wireless communications by a source node, in accordance with certain aspects of the present disclosure.

FIG. 9 is a flow diagram illustrating example operations 900 for wireless communication, in accordance with certain aspects of the present disclosure. The operations 900 may be performed, for example, by a source node (e.g., such as the BS 110*a* in the wireless communication network 100 of FIG. 1). The operations 900 may be implemented as software components that are executed and run on one or more processors (e.g., the controller/processor 440 of FIG. 4). Further, the transmission and reception of signals by the source node in operations 900 may be enabled, for example, by one or more antennas (e.g., the antennas 434 of FIG. 4). In certain aspects, the transmission and/or reception of signals by the source node may be implemented via a bus interface of one or more processors (e.g., the controller/processor 440) obtaining and/or outputting signals.

The operations 900 may begin, at 902, by sending to a target node a HO request message for a DAPS HO of a UE from the source node to the target node.

At 904, the source node receives from the target node a response to the HO request message that includes a PDCP duplication for a completion phase of the DAPS HO that takes into account one or more capabilities of the UE related to PDCP duplication and a current duplication configuration of the UE.

At 906, the source node sends the UE a reconfiguration message that includes an indication of the PDCP duplication configuration for the completion phase of the DAPS HO as received from the target node.

Figure 10:
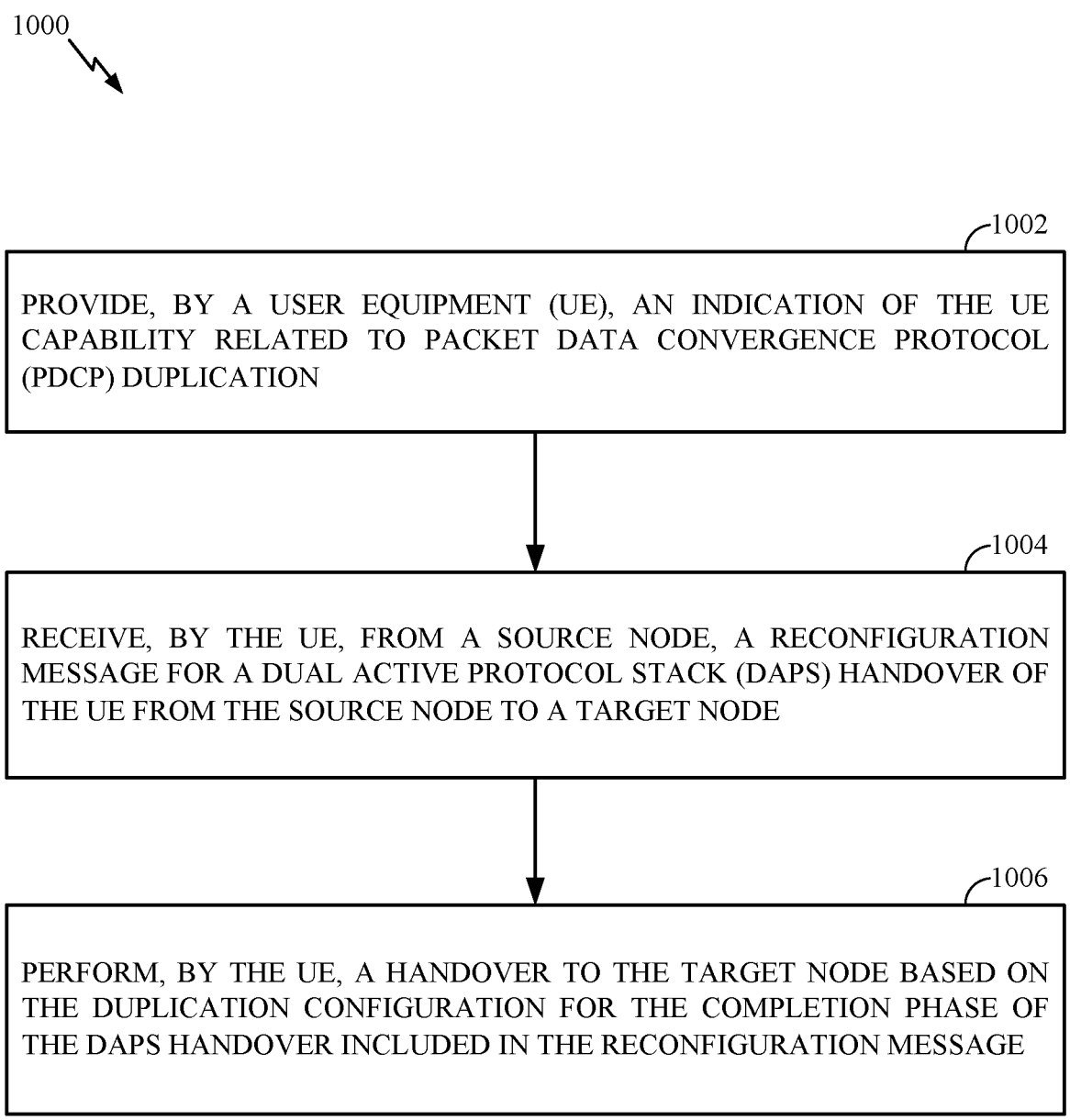
FIG. 10 is a flow diagram illustrating example operations for wireless communications by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as the UE 120*a* in the wireless communication network 100 of FIG. 1). The operations 1000 may be implemented as software components that are executed and run on one or more processors (e.g., the controller/processor 480 of FIG. 4). Further, the transmission and reception of signals by the UE in operations 1000 may be enabled, for example, by one or more antennas (e.g., the antennas 452 of FIG. 4). In certain aspects, the transmission and/or reception of signals by the UE may be implemented via a bus interface of one or more processors (e.g., the controller/processor 480) obtaining and/or outputting signals.

The operations 1000 may begin, at 1002, by providing an indication of UE capabilities related to PDCP duplication.

At 1004, the UE receives, from a source node, a reconfiguration message for a DAPS HO of the UE from the source node to a target node. The reconfiguration message indicates a PDCP duplication configuration for a completion phase of the DAPS HO that takes into account one or more capabilities of the UE related to the PDCP duplication and a current duplication of the UE.

At 1006, the UE performs a HO to the target node based on the PDCP duplication configuration for the completion phase of the DAPS HO included in the reconfiguration message.

The operations shown in FIGS. 8-10 are further described with reference to a call flow diagram 1100 of FIG. 11, which shows steps (enumerated 1-6) a DAPS HO scenario, in accordance with aspects of the present disclosure.

The procedures/message shown may be applicable to a MR-DC HO. However, similar corresponding steps may be applicable to other DAPS HOs, such as Standalone to Standalone, MR-DC to Standalone, or MR-DC to MR-DC. In certain aspects, during a HO completion phase of a DAPS HO, a UE may maintain two, three, or four connections to a network.

Figure 11:
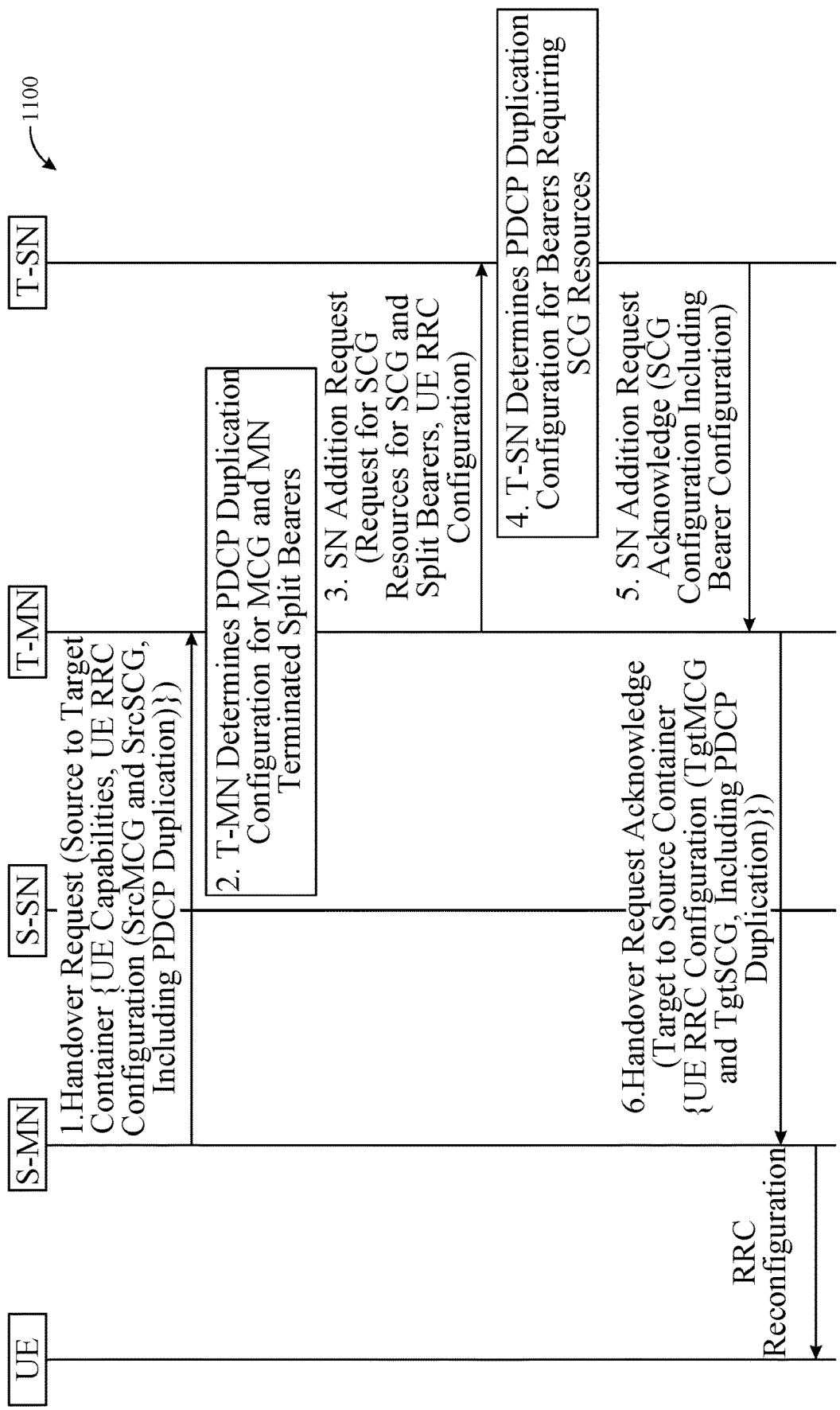
FIG. 11 illustrates an example call flow illustrating example signaling for a DAPS HO, in accordance with certain aspects of the present disclosure.

Referring to the MR-DC HO, as shown in FIG. 11, there are at least four types of DRBs that require configuration. These DRBs include: master cell group (MCG) bearers (e.g., using MCG resources only), master node (MN) terminated split bearers, secondary cell group (SCG) bearers (e.g., using SCG resources only), and secondary node (SN) terminated split bearers. As shown, the procedures include the addition of a PDCP duplication configuration in various messages among the UE, a source MN, a source SN, a target MN, and a target SN. In particular, the coordination between the MNs and the SNs are required for the configuration of MN terminated and SN terminated split bearers.

As illustrated, the source MN sends HO request to the target MN (at step 1). The HO request may be in a source to target container and includes the UE capabilities and the UE RRC configuration of the current connection between the UE and the source. The target MN determines the PDCP duplication configuration for MCG and MN terminated split bearers (at step 2). The configuration includes activation of RLC entities, of MCG bearers, and of MN terminated split bearers for the MCG leg.

The target MN sends an addition request to the target SN to reserve SCG resources for the SCG bearers, the MN terminal split bears, and the SN terminated split bearers. For example, at step 3, the additional request may include a request for the SCG resources for SCG and split bearers and in some instances, UE RRC configuration. For the SN terminated split bearers, the target MN may provide a maximum QoS level that it may support. In the current example, the additional request may include additional information, such as, for example, UE capabilities, UE measurement results, and source MCG and SCG configurations. In some embodiments, the source MCG and SCG configurations may include a status and a number of currently activated RLC entities for each duplicated RB.

The target SN determines the subset of bearers requested by the target MN. The target SN reserves SCG resources for the target MN and indicates to the target MN that a subset in an SN addition request acknowledge message to be sent. For example, the target SN determines (at step 4) the PDCP duplication configuration for bearers requiring the SCG resources and generates the SN addition request acknowledge message (at step 5). For example, the PDCP duplication configuration determined by the target SN may include a number of activated RLC entities and the subset of bearers for the SCG leg. In some embodiments, the target SN may indicate in the SN addition request acknowledge message of the subset of bearers requested by the target MN when the target SN cannot reserve SCG resources for the target MN. The target MN may further request resources from the target MN to meet the QoS requirements when the QoS level requested is smaller than the level MN offered in the SN addition request acknowledgement message.

After receiving the SN addition request acknowledgement message from the target SN, the target MN may determine the PDCP duplication configuration for SN terminated split bearers for the MCG leg. The target MN then sends the HO request acknowledgement message to the source MN (at step 6). The HO request acknowledgement message provides the RRC reconfiguration message in a target to source container to be forwarded transparently to the UE. At the end of the example procedures 1100, the source MN sends the RRC reconfiguration message to the UE. The RRC reconfiguration message contains the PDCP duplication configuration for all four types of DRBs mentioned above.

In certain aspects, during HO preparation, the source node may signal the target node using an Xn/X2 HO request message (not shown). The Xn/X2 HO request message may include at least a source to target container that specifies several aspects of the HO. For example, the Xn/X2 HO request message may include an indication of the UE capabilities that include the number of RLC entities available or otherwise applicable for PDCP duplication connections. The Xn/X2 HO request message may further include a UE RRC configuration, which carries a currently configured number of RLC entities and a number of currently activated number of RLC entities for each duplicated RB. In some aspects, the currently configured number of RLC entities and the number of currently activated number of RLC entities may be different, as discussed in a following example related to FIG. 13 discussed below. In addition, the Xn/X2 HO request message may include UE measurement results.

In certain aspects, upon receiving the signal from the source node, the target node may determine the duplication configuration to be sent to the UE in the response message in view of the Xn/X2 HO request message. The duplication configuration may include information provided in the Xn/X2 HO request message as mentioned above. For example, the duplication configuration may include the UE measurement results provided in the source to target container in order to determine the radio conditions of the target cell and any target secondary cells (SCells). Furthermore, the duplication configuration may include the duplication capabilities of the target node. In some aspects, the target node may have different duplication capabilities than those of the source node. For example, the target node may have less RLC entities available than those in the source node, which may limit establishing duplication connections with the UE. Finally, the duplication configuration may at least include QoS requirements of RBs.

In certain aspects, upon completing the HO and during the completion phase of the DAPS HO, the target node may send an acknowledgement message to the source node. The acknowledgement message may include at least a target to source container that specifies the following aspects. For example, the acknowledgement message may include configuration and activation of RLC entities for each duplicated RB for the target connection. In some aspects, due to capacity differences between the target node and the source node, there may be RLC entities configured by the target node in addition to those configured by the source node for an RB, as long as the total number of RLC entities does not exceed the capabilities of the UE. As illustrated here in FIG. 7, RLC3 and RLC4 of the UE have been configured by the target node in addition to the RLC1 and the RLC2 by the source node.

In certain aspects, the acknowledgement message from the target node to the source node may further include configuration and activation after the HO completion phase has been finished. For example, after finishing HO, the UE is in communication with the target node only. The configuration of the UE may be the same as the configuration used in the HO completion phase (i.e., before the UE is disconnected from the source node). As such, the acknowledgement message may inform the source node regarding the same. For example, the configuration may include the number of activated RLC entities for each duplicated RB.

In certain aspects, the source node and the target node are configured to maintain or reduce the number of RLC entity connections. For example, the source node and the target node may only deconfigure or deactivate an RLC entity for a duplicated RB during the HO execution and completion phases (i.e., no addition of new RLC entity). As such, the source node and the target node, during the DAPS HO, are not configured to exceed the capabilities of the UE.

In certain aspects, the UE may transmit MAC CEs to provide dynamic updates of the configured and activated RLC entities. For example, the UE may transmit MAC CEs before, during, or after the DAPS HO. In such situations, the UE may modify the configuration and activation status of the RLC entities of the duplicated RB.

In certain aspects, the network may be configured to prevent modification to the configuration and activation of the RLC entities of the UE by the source node or the target node. For example, when the source node or the target node sends an RRC reconfiguration message or a MAC CE to the UE during the HO execution or completion phases, the UE may disregard the RRC reconfiguration message or the MAC CE.

In certain aspects, the HO request message may include an indication of the capabilities of the UE related to the PDCP duplication. The HO request message may also include the current duplication configuration of the UE. In some aspects, the target node may receive from the source node an indication of the capabilities of the UE related to the PDCP duplication and the current duplication configuration of the UE.

In certain aspects, such as in a multi TRPs situation, the HO request message may contain a source UE radio configuration that indicates a mapping of logical channels associated with RLC entities of RBs to TRPs. The mapping may be designed to ensure that different logical channels are mapped to different TRPs to obtain benefits of a packet duplication. The target node may also consider multi-TRP transmission and reception capability of the target node and multi-TRP transmission and reception capabilities of the UE when determining the PDCP duplication configuration for the completion phase of the DAPS HO. The PDCP duplication configuration provided by the target node may also include a mapping of the logical channels associated with the RLC entities of the RBs to the TRPs.

In certain aspects, the capabilities of the UE related to the PDCP duplication includes at least one of a maximum number of duplicated RBs the UE supports.

In certain aspects, the indication of the current duplication configuration of the UE may indicate the RLC entities that are currently activated for each duplicated RB during a preparation phase of the DAPS HO. The target may ensure the PDCP duplication configuration for the completion phase of the DAPS HO does not exceed the capabilities of the UE related to the PDCP duplication or duplication capabilities of the target node.

In certain aspects, the indication of the capabilities of the UE related to the PDCP duplication may indicate at least one of: whether the UE supports the PDCP duplication by a DRB, a SRB, or both; or whether the UE supports the PDCP duplication for a split SRB or DRB.

In certain aspects, the target node may be limited to deconfiguring or deactivating an RLC entity for a duplicated RB during the completion phase of the DAPS HO. In some aspects, the target node may not be allowed to modify the configuration or activation status of the RLC entities for the duplicated RB during the completion phase of the DAPS HO.

In certain aspects, if the UE transmits MAC CEs providing dynamic updates of configured and activated RLC entities, then the target has flexibility to modify the configuration and activation status of the RLC entities of the duplicated RB during the completion phase of the DAPS HO.

In certain aspects, the target node may include a MN of a target MCG. The target node may coordinate with at least one SN of a SCG for the DPCP duplication configuration of one or more RBs. For example, the coordination may include sending an SN addition request to reserve resources for at least one of: SCG bearers, MN terminated split bearers, or SN terminated split bearers. The SN addition request may indicate the capabilities of the UE related to the PDCP duplication, current source MCG, and source SCG duplication configuration of the UE. The target MN may determine the PDCP duplication configuration for SN terminated split bearers based on a response to the SN addition request in an SN addition request acknowledgement message. The target MN may determine the PDCP duplication configuration for MCG and MN terminated split bearers.

In certain aspects, the target node may also determine the PDCP duplication configuration based on at least one of PDCP duplication capabilities of the UE, UE measurement results, or QoS requirements of each RB accepted for the HO by the target node. In some aspects, the target node may be limited to deconfiguring or deactivating the RLC entity for the duplicated RB during the completion phase of the DAPS HO.

In certain aspects, if the UE transmits the MAC CEs providing dynamic updates of configured and activated RLC entities, then the target has flexibility to modify the configuration and activation status of the RLC entities of the duplicated RB during the completion phase of the DAPS HO.

In certain aspects, the source node may send the target node an indication of the capabilities of the UE related to the PDCP duplication and the current duplication configuration of the UE. For example, the HO request message may include the indication of the capabilities of the UE related to the PDCP duplication and the current duplication configuration of the UE. In some aspects, the HO request message may contain a source UE radio configuration that may indicate a mapping of logical channels associated with the RLC entities of RBs to TRPs. The mapping may be designed to ensure that different logical channels are mapped to different TRPs.

In certain aspects, the capabilities of the UE related to the PDCP duplication includes at least one of: a maximum number of duplicated RBs the UE supports; or a maximum number of activated RLC entities per duplicated RB the UE supports. For example, the indication of the current duplication configuration of the UE may indicate the RLC entities that are currently activated for each duplicated RB during a preparation phase of the DAPS HO. The indication of the capabilities of the UE related to the PDCP duplication may indicate at least one of: whether the UE supports the PDCP duplication for a DRB, an SRB, or both; or whether the UE supports PDCP duplication for a split SRB or DRB. In some aspects, the target node may include an MN of a target MCG and coordinates with at least one SN for the PDCP duplication configuration of one or more RBs.

In certain aspects, the capabilities of the UE related to the PDCP duplication may include at least one of: a maximum number of duplicated RBs the UE supports; or a capabilities of the UE related to the PDCP duplication. For example, the indication of the capabilities of the UE related to the PDCP duplication may indicate at least one of: whether the UE supports PDCP duplication for a DRB, an SRB, or both; or whether the UE supports PDCP duplication by split SRB or DRB. In some instances, the target node may include an MN of a target MCG. The duplication configuration for the completion phase of the DAPS HO may include target MCG and target SCG duplication configurations.

In certain aspects, such as, in multi-TRP situations, the UE may receive a source UE radio configuration that indicates a mapping of logical channels associated with the RLC entities of RBs to TRPs. The mapping may be designed to ensure that different logical channels are mapping to different TRPs.

Figure 12:
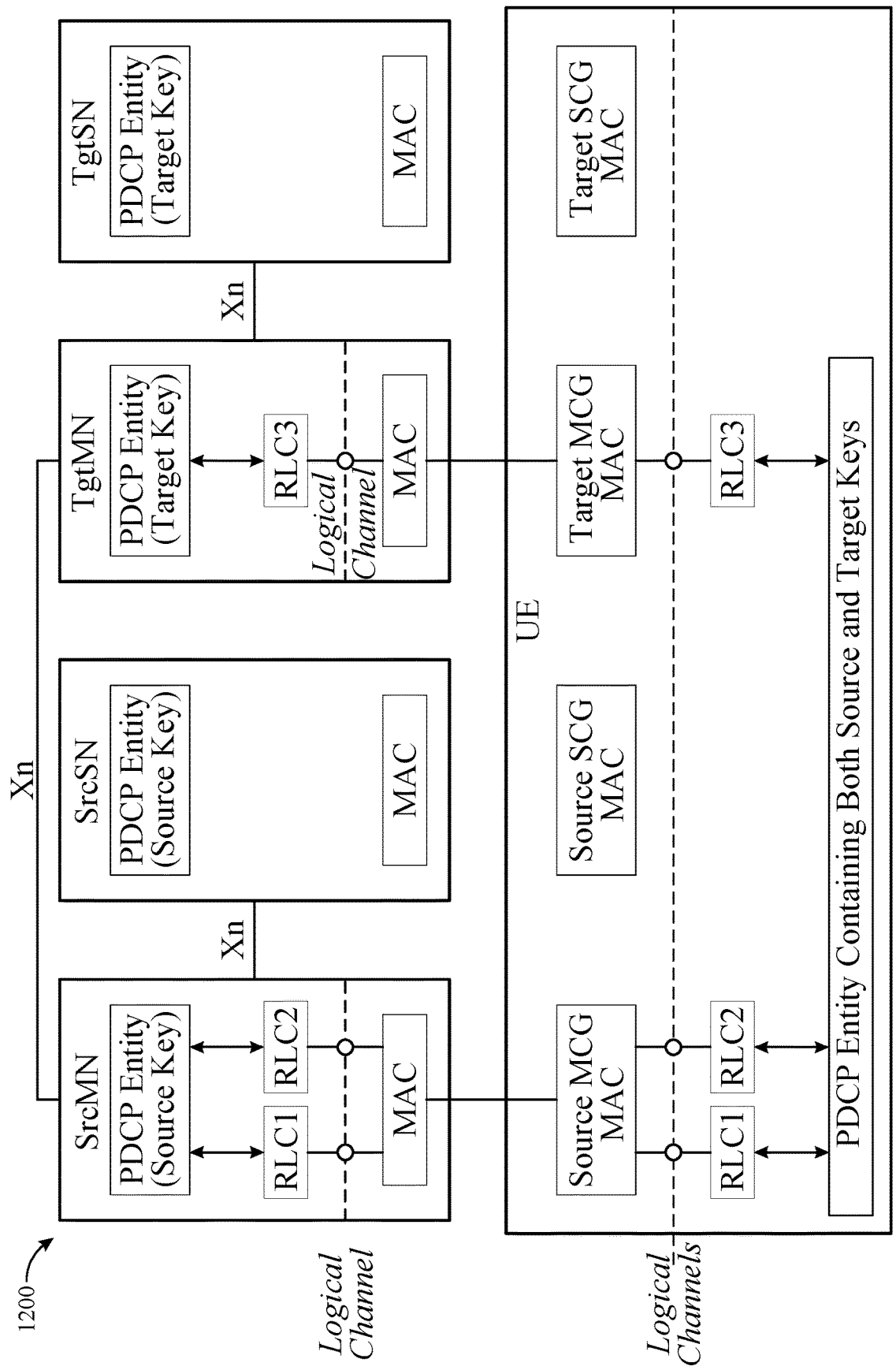
FIGS. 12 and 13 illustrate example scenarios of PDCP duplication in DAPS HO, in accordance with certain aspects of the present disclosure.

FIG. 12 illustrates an example scenario 1200 of PDCP duplication in a DAPS HO for an MCG bearer during a completion phase, in accordance with aspects of the present disclosure. In the example scenario 1200, the PDCP duplication is applied to the MCG bearer with CA duplication in an MR-DC HO. As shown, a UE includes a source MCG MAC, a source SCG MAC, a target MCG MAC, and a target SCG MAC. The source MCG MAC is connected with a RLC1 and a RLC2 of the UE. The target MCG MAC is connected with a RLC3 of the UE. The maximum number of RLC entities that can be configured for a RB in the illustrated example is three (i.e., the RLC1, the RLC2, and the RLC3 of the UE). This maximum may be different in other scenarios.

In FIG. 12, a network includes a source MN, a source SN, a target MN, and a target SN. The source MN includes a MAC of the source MN, aRLC1 and a RLC2 of the source MN, and a PDCP entity of the source MN. The source SN includes a MAC of the source SN and a PDCP entity of the source SN. The source SN communicates with the source MN via Xn.

The target MN includes a MAC of the target MN, a RLC3 of the target MN, and the PDCP entity of the target MN. The target SN includes a MAC and a PDCP entity. The target SN communicates with the target MN via the Xn. The target MN communicates with the source MN via the Xn. In this example scenario 1200, the target MN does not configure the same number of the RLC entities as the source MN because the UE does not have a fourth RLC entity available for the target MCG MAC. In some aspects, the target MN may configure based on the available number of RLC entities at the UE (e.g., not exceeding the network capacity of the UE).

Figure 13:
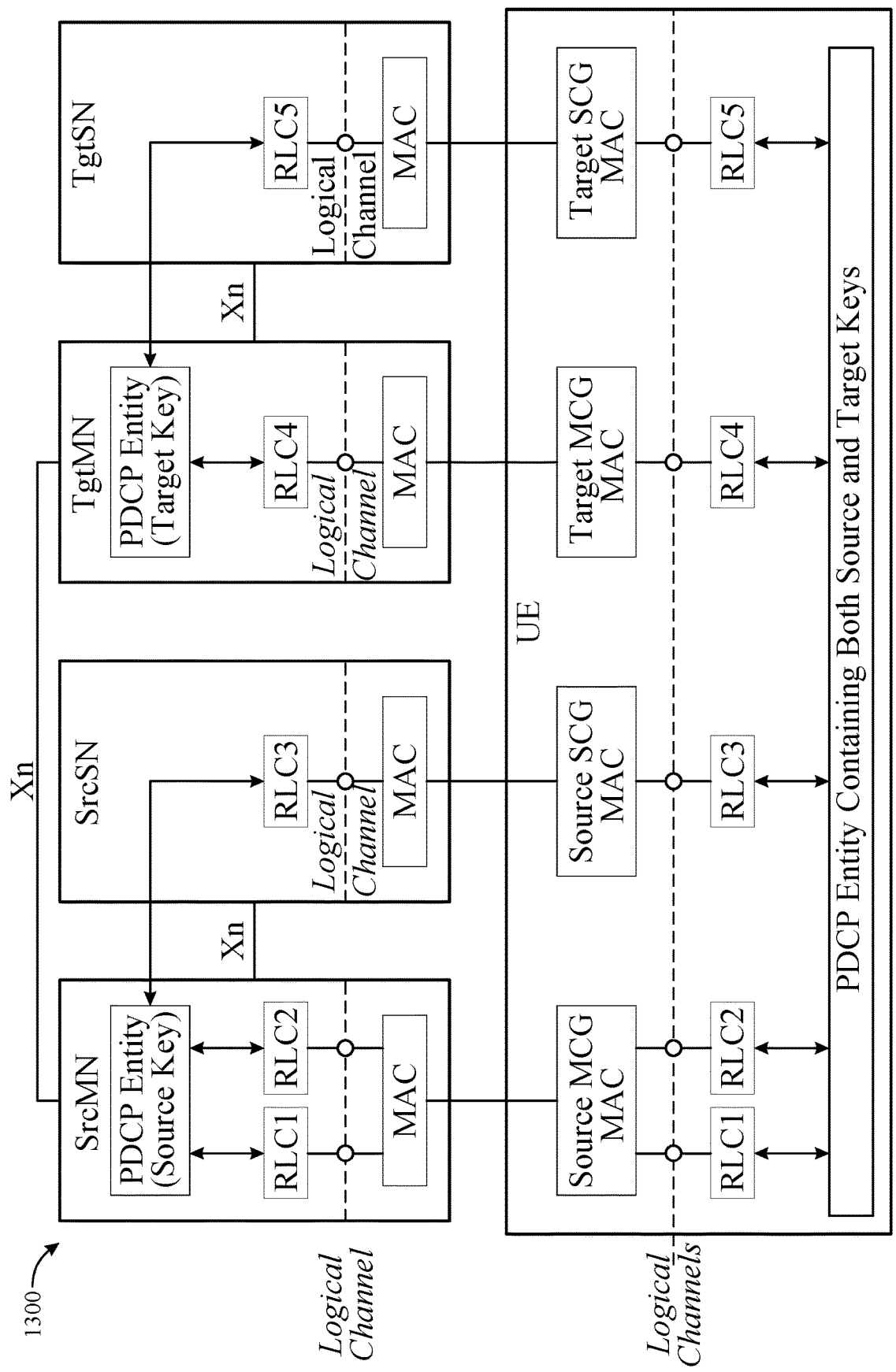

FIG. 13 illustrates another example scenario 1300 (e.g., for a split RB terminated in MN) of PDCP duplication in a DAPS HO, in accordance with aspects of the present disclosure. As shown, a UE in this example scenario 1300 includes a RLC1, a RLC2, a RLC3, a RLC4, and a RLC5. The RLC1 and the RLC2 of the UE connect to a source MCG MAC. The RLC3 of the UE connects to a source SCG MAC. The RLC4 connects to a target MCG MAC. The RLC5 connects to a target SCG MAC.

As shown in FIG. 13, a source MN, a source SN, a target MN, and a target SN respectively includes a MAC. The MAC of the source MN connects to the RLC1 and the RLC2 of the source MN, both of which connect to a PDCP entity of the source MN. The MAC connects to the RLC3 that is also connected to the PDCP entity. In the target MN, the MAC connects to the RLC4 that is connected to the PDCP entity. In the target SN, the MAC connects to the RLC5 that also connects to the PDCP entity. The source MN communicates with the target MN via Xn.

In the example scenario 1300, the target MN has one RLC entity, as such, one RLC entity less than the source MN. During the HO, the configuration of the connection of two RLC entities between the UE and the source MN is updated to reflect the capacity of the target MN according to the methods disclosed herein. In some aspects, the source and the target may include a number of RLC entities (or in a different configuration) than the ones illustrated when applying the methods and/or techniques disclosed herein. For example, during CHO and DAPS HO, similar PDCP duplication configuration to the UE may be performed in each candidate CHO target cell configuration, such as, for example, in case DAPS HO is also configured for the target cell.

In certain aspects, although not illustrated, source and target nodes of the example scenarios 1200 and 1300 may be substituted with other applicable network nodes, for example, when in multi-TRP situations. Such multi-TRP situations may replicate transmissions when one TRP transmission (i.e., similar to the source in the example scenarios) encounters a poor link quality and the same transmission is replicated in other TRPs (i.e., similar to the target in the example scenarios). The multi-TRP network may provide radio configuration to the UE.

For example, in a CA duplication case, a network may configure the UE to use logical channel mapping restrictions in a MAC to ensure that primary and secondary logical channels are not set on a same carrier. Such logical channel mapping restrictions may be introduced in the MAC also to ensure that different logical channels are mapped to different TRPs to obtain the benefits of a packet duplication. The configuration of such logical channel mapping restrictions may be provided via a RRC reconfiguration message to the UE.

In such cases, the source may send a HO request message to the target about the UE capabilities and RRC reconfiguration. The HO request message may include information related to the PDCP duplication, such as configuration and activation of RLC entities for each duplicated RB and the mapping of logical channels associated with the RLC entities to TRPs. The target may provide in a HO request acknowledgement message to the UE a PDCP duplication configuration, including configuration and activation of RLC entities for each duplicated RB and a mapping of logical channels associated with the RLC entities to TRPs. In order to determine the PDCP duplication configuration, the target considers its own multi-TRP transmission reception capabilities and the information provided in the HO request message from the source.

Figure 14:
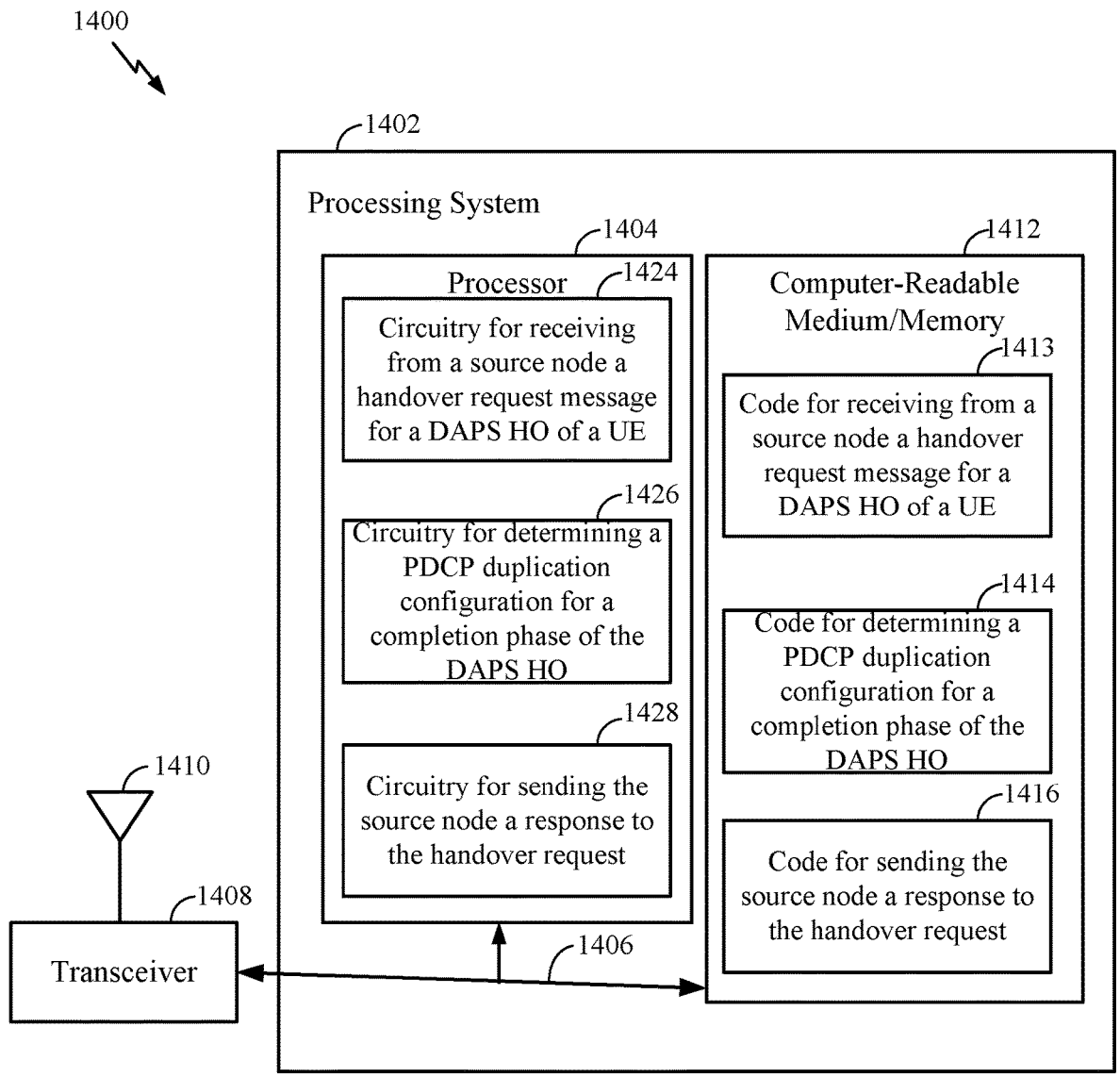
FIG. 14 illustrates a communications device that may include various components configured to perform operations for the techniques disclosed herein, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein. In certain aspects, computer-readable medium/memory 1412 stores: the code 1413 for receiving from a source node a HO request message for a DAPS HO of a UE from the source node to the target node; the code 1414 for determining a PDCP duplication configuration for a completion phase of the DAPS HO taking into account one or more capabilities of the UE related to PDCP duplication and a current PDCP duplication configuration of the UE; and the code 1416 for sending the source node a response to the HO request including an indication of the duplication configuration for the completion phase of the DAPS HO.

In certain aspects, the processor 1404 has circuitry configured to implement the code stored in the computer-readable medium/memory 1412. The processor 1404 includes the circuitry 1424 for receiving from a source node a HO request message for a DAPS HO of a UE from the source node to the target node, the circuitry 1426 for determining a duplication configuration for a completion phase of the DAPS HO taking into account one or more capabilities of the UE related to PDCP duplication and a current PDCP duplication configuration of the UE; and the circuitry 1428 for sending the source node a response to the HO request including an indication of the duplication configuration for the completion phase of the DAPS HO.

Figure 15:
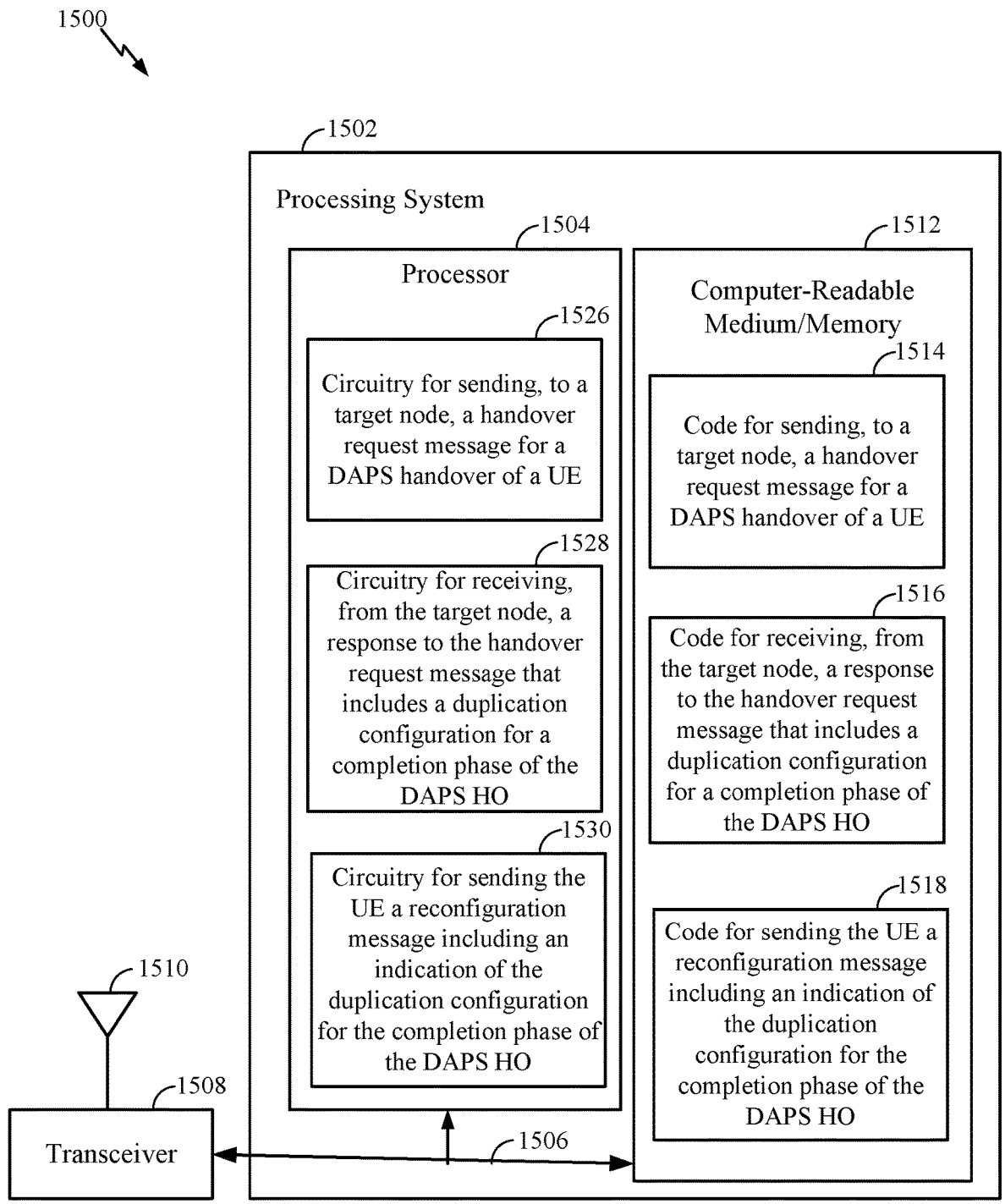
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 9. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 9, or other operations for performing the various techniques discussed herein. In certain aspects, computer-readable medium/memory 1512 stores the code 1514 for sending, to a target node, a HO request message for a DAPS HO of a UE from the source node to the target node; the code 1516 for receiving, from the target node, a response to the HO request message that includes a duplication configuration for a completion phase of the DAPS HO that takes into account one or more capabilities of the UE related to packet data convergence protocol (PDCP) duplication and a current PDCP duplication configuration of the UE; and the code 1518 for sending the UE a reconfiguration message including an indication of the duplication configuration for the completion phase of the DAPS HO as received from the target node.

In certain aspects, the processor 1504 has circuitry configured to implement the code stored in the computer-readable medium/memory 1512. The processor 1504 includes the circuitry 1526 for sending, to a target node, a HO request message for a DAPS HO of a UE from the source node to the target node; the circuitry 1528 for receiving, from the target node, a response to the HO request message that includes a duplication configuration for a completion phase of the DAPS HO that takes into account one or more capabilities of the UE related to packet data convergence protocol (PDCP) duplication and a current PDCP duplication configuration of the UE; and the circuitry 1530 for sending the UE a reconfiguration message including an indication of the duplication configuration for the completion phase of the DAPS HO as received from the target node.

Figure 16:
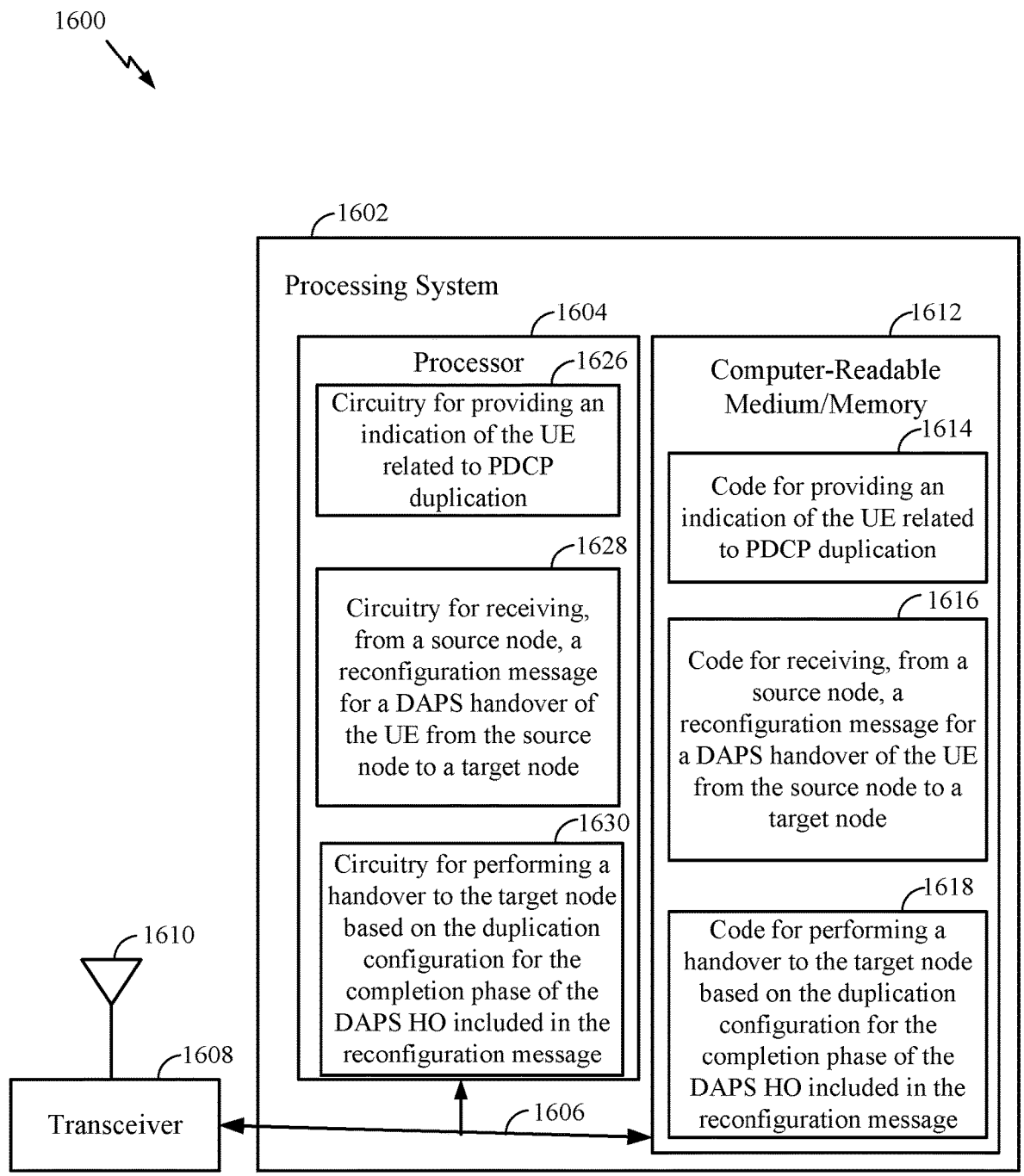
FIG. 16 illustrates a communications device that may include various components configured to perform operations for the techniques disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 10. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 10, or other operations for performing the various techniques discussed herein. In certain aspects, computer-readable medium/memory 1612 stores: the code 1614 for providing an indication of the UE related to PDCP duplication; the code 1616 for receiving, from a source node, a reconfiguration message for a DAPS HO of the UE from the source node to a target node where the reconfiguration message indicates a PDCP duplication configuration for a completion phase of the DAPS HO that takes into account one or more capabilities of the UE related to the PDCP duplication and a current PDCP duplication configuration of the UE, and the code 1618 for performing a HO to the target node based on the duplication configuration for the completion phase of the DAPS HO included in the reconfiguration message.

In certain aspects, the processor 1604 has circuitry configured to implement the code stored in the computer-readable medium/memory 1612. The processor 1604 includes the circuitry 1626 for providing an indication of the UE related to PDCP duplication, the circuitry 1628 for receiving, from a source node, a reconfiguration message for a DAPS HO of the UE from the source node to a target node where the reconfiguration message indicates a PDCP duplication configuration for a completion phase of the DAPS HO that takes into account one or more capabilities of the UE related to the PDCP duplication and a current PDCP duplication configuration of the UE; and the circuitry 1630 for performing a HO to the target node based on the duplication configuration for the completion phase of the DAPS HO included in the reconfiguration message.

EXAMPLE ASPECTS

Implementation examples are described in the following numbered aspects.

In a first aspect, a method for wireless communication by a target node, comprising: receiving, from a source node, a handover (HO) request message for a dual active protocol stack (DAPS) HO of a user equipment (UE) from the source node to the target node; determining a packet data convergence protocol (PDCP) duplication configuration for a completion phase of the DAPS HO, taking into account one or more capabilities of the UE related to PDCP duplication and a current PDCP duplication configuration of the UE; and sending the source node a response to the HO request including an indication of the PDCP duplication configuration for the completion phase of the DAPS HO.

In a second aspect, alone or in combination with the first aspect, the target node also determines the PDCP duplication configuration based on at least one of PDCP duplication capabilities of the target node, UE measurement results, or quality of service (QoS) requirements of each radio bearer accepted for HO by the target node.

In a third aspect, alone or in combination with one or more of the first and second aspects, receiving from the source node an indication of the capabilities of the UE related to PDCP duplication and the current PDCP duplication configuration of the UE.

In a fourth aspect, alone or in combination with one or more of the first through third aspects, the HO request message includes the indication of the capabilities of the UE related to PDCP duplication and the current PDCP duplication configuration of the UE.

In a fifth aspect, alone or in combination with one or more of the first through fourth aspects, the capability of the UE related to PDCP duplication comprises at least one of: a maximum number of duplicated radio bearers (RBs) the UE supports; or a maximum number of activated radio link control (RLC) entities per duplicated RB the UE supports.

In a sixth aspect, alone or in combination with one or more of the first through fifth aspects, the indication of the current PDCP duplication configuration of the UE indicates RLC entities that are currently configured and RLC entities that are currently activated for each duplicated RB during a preparation phase of the DAPS HO; and the target node ensures the PDCP duplication configuration for the completion phase of the DAPS HO does not exceed the capabilities of the UE related to PDCP duplication, e.g., the maximum number of configured or activated RLC entities per duplicated RB the UE supports.

In a seventh aspect, alone or in combination with one or more of the first through sixth aspects, the indication of the capability of the UE related to PDCP duplication indicates at least one of: whether the UE supports PDCP duplication for a data radio bearer (DRB), a signaling radio bearer (SRB), or both; or whether the UE supports PDCP duplication for a split SRB or DRB.

In an eighth aspect, alone or in combination with one or more of the first through seventh aspects, the target node is limited to deconfiguring or deactivating a radio link control (RLC) entity for a duplicated radio bearer during the completion phase of the DAPS HO.

In a ninth aspect, alone or in combination with one or more of the first through eighth aspects, if the UE transmits medium access control (MAC) control elements (CEs) providing dynamic updates of configured and activated radio link control (RLC) entities, then the target has flexibility to modify the configuration and activation status of RLC entities of a duplicated radio bearer during the completion phase of the DAPS HO.

In a tenth aspect, alone or in combination with one or more of the first through ninth aspects, the target node is not allowed to modify the configuration or activation status of radio link control (RLC) entities for a duplicated radio bearer during the completion phase of the DAPS HO.

In an eleventh aspect, alone or in combination with one or more of the first through tenth aspects, the target node comprises a master node (MN) of a target master cell group (MCG) and coordinates with at least one secondary node (SN) of a secondary cell group (SCG) for the PDCP duplication configuration of one or more RBs.

In a twelfth aspect, alone or in combination with one or more of the first through eleventh aspects, the coordination comprises sending an SN addition request to reserve resources for at least one of: secondary cell group (SCG) bearers, MN terminated split bearers, or SN terminated split bearers, wherein the SN addition request indicates the capability of the UE related to PDCP duplication, current source MCG and source SCG PDCP duplication configurations of the UE; the target MN determines a PDCP duplication configuration for SN terminated split bearers based on a response to the SN addition request in an SN addition request acknowledge message; and the target MN determines a PDCP duplication configuration for MCG and MN terminated split bearers, whereas a target SN determines the configuration for SCG bearers and SN terminated split bearers.

In a thirteenth aspect, alone or in combination with one or more of the first through twelfth aspects, the HO request message contains a source UE radio configuration that indicates a mapping of logical channels associated with RLC entities of radio bearers to transmitter receiver points (TRPs), wherein the mapping is designed to ensure that different logical channels are mapped to different TRPs.

In a fourteenth aspect, alone or in combination with one or more of the first through thirteenth aspects, the target node also considers multi-TRP transmission and reception capability of the target node and multi-TRP transmission and reception capabilities of the UE when determining the PDCP duplication configuration for the completion phase of the DAPS HO; and the PDCP duplication configuration provided by the target node also includes a mapping of logical channels associated with RLC entities of radio bearers to TRPs.

In a fifteenth aspect, a method for wireless communication by a source node, comprising: sending, to a target node, a handover (HO) request message for a dual active protocol stack (DAPS) HO of a user equipment (UE) from the source node to the target node; receiving, from the target node, a response to the HO request message that includes a packet data convergence protocol (PDCP) duplication configuration for a completion phase of the DAPS HO that takes into account one or more capabilities of the UE related to packet data convergence protocol (PDCP) duplication and a current PDCP duplication configuration of the UE; and sending the UE a reconfiguration message including an indication of the PDCP duplication configuration for the completion phase of the DAPS HO as received from the target node.

In a sixteenth aspect, alone or in combination with the fifteenth aspect, sending the target node an indication of the capability of the UE related to PDCP duplication and the current PDCP duplication configuration of the UE.

In a seventeenth aspect, alone or in combination with one or more of the fifteenth and sixteenth aspects, the HO request message includes the indication of the capability of the UE related to PDCP duplication and the current PDCP duplication configuration of the UE.

In an eighteenth aspect, alone or in combination with one or more of the fifteenth through seventeenth aspects, the capability of the UE related to PDCP duplication comprises at least one of: a maximum number of duplicated radio bearers (RBs) the UE supports; or a maximum number of activated radio link control (RLC) entities per duplicated RB the UE supports.

In a nineteenth aspect, alone or in combination with one or more of the fifteenth through eighteenth aspects, the indication of the current PDCP duplication configuration of the UE indicates RLC entities that are currently configured and activated for each duplicated RB during a preparation phase of the DAPS HO.

In a twentieth aspect, alone or in combination with one or more of the fifteenth through nineteenth aspects, the indication of the capability of the UE related to PDCP duplication indicates at least one of: whether the UE supports PDCP duplication for a data radio bearer (DRB), a signaling radio bearer (SRB), or both; or whether the UE supports PDCP duplication for a split SRB or DRB.

In a twenty-first aspect, alone or in combination with one or more of the fifteenth through twentieth aspects, the target node comprises a master node (MN) of a target master cell group (MCG) and coordinates with at least one secondary node (SN) for the PDCP duplication configuration of one or more RBs.

In a twenty-second aspect, alone or in combination with one or more of the fifteenth through twenty-first aspects, the HO request message contains a source UE radio configuration that indicates a mapping of logical channels associated with RLC entities of radio bearers to transmitter receiver points (TRPs), wherein the mapping is designed to ensure that different logical channels are mapped to different TRPs.

In a twenty-third aspect, a method for wireless communication by a user equipment (UE), comprising: providing an indication of UE capabilities related to packet data convergence protocol (PDCP) duplication; receiving, from a source node, a reconfiguration message for a dual active protocol stack (DAPS) handover (HO) of the UE from the source node to a target node, wherein the reconfiguration message indicates a packet data convergence protocol (PDCP) duplication configuration for a completion phase of the DAPS HO that takes into account one or more capabilities of the UE related to the PDCP duplication and a current PDCP duplication configuration of the UE; and performing a HO to the target node based on the PDCP duplication configuration for the completion phase of the DAPS HO included in the reconfiguration message.

In a twenty-fourth aspect, alone or in combination with the twenty-third aspect, the capability of the UE related to PDCP duplication comprises at least one of: a maximum number of duplicated radio bearers (RBs) the UE supports; or a maximum number of activated radio link control (RLC) entities per duplicated RB the UE supports.

In a twenty-fifth aspect, alone or in combination with one or more of the twenty-third and twenty-fourth aspects, the indication of the capability of the UE related to PDCP duplication indicates at least one of: whether the UE supports PDCP duplication by a data radio bearer (DRB), a signaling radio bearer (SRB), or both; or whether the UE supports PDCP duplication by a split SRB or DRB.

In a twenty-sixth aspect, alone or in combination with one or more of the twenty-third through twenty-fifth aspects, the target node comprises a master node (MN) of a target master cell group (MCG); and the PDCP duplication configuration for the completion phase of the DAPS HO includes target MCG and target secondary cell group (SCG) PDCP duplication configurations.

In a twenty-seventh aspect, alone or in combination with one or more of the twenty-third through twenty-sixth aspects, receiving a source UE radio configuration that indicates a mapping of logical channels associated with RLC entities of radio bearers to transmitter receiver points (TRPs), wherein the mapping is designed to ensure that different logical channels are mapped to different TRPs.

An apparatus for wireless communication, comprising at least one processor; and a memory coupled to the at least one processor, the memory comprising code executable by the at least one processor to cause the apparatus to perform the method of any of the first through twenty-seventh aspects.

An apparatus comprising means for performing the method of any of the first through twenty-seventh aspects.

A computer readable medium storing computer executable code thereon for wireless communications that, when executed by at least one processor, cause an apparatus to perform the method of any of the first through twenty-seventh aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8, FIG. 9, and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a target node, comprising:
   receiving, from a source node, a handover (HO) request message for a dual active protocol stack (DAPS) HO of a user equipment (UE) from the source node to the target node;
   determining a packet data convergence protocol (PDCP) duplication configuration for a completion phase of the DAPS HO, taking into account one or more capabilities of the UE related to PDCP duplication and a current PDCP duplication configuration of the UE; and
   sending the source node a response to the HO request including an indication of the PDCP duplication configuration for the completion phase of the DAPS HO.

2. The method of claim 1, wherein the target node also determines the PDCP duplication configuration based on at least one of PDCP duplication capabilities of the target node, UE measurement results, or quality of service (QoS) requirements of each radio bearer accepted for HO by the target node.

3. The method of claim 1, further comprising receiving, from the source node, an indication of the capabilities of the UE related to PDCP duplication and the current PDCP duplication configuration of the UE.

4. The method of claim 3, wherein the HO request message includes the indication of the capabilities of the UE related to PDCP duplication and the current PDCP duplication configuration of the UE.

5. The method of claim 1, wherein the capability of the UE related to PDCP duplication comprises at least one of:
   a maximum number of duplicated radio bearers (RBs) the UE supports; or
   a maximum number of activated radio link control (RLC) entities per duplicated RB the UE supports.

6. The method of claim 1, wherein:
   the indication of the current PDCP duplication configuration of the UE indicates RLC entities that are currently configured and RLC entities that are currently activated for each duplicated RB during a preparation phase of the DAPS HO; and
   the target node ensures the PDCP duplication configuration for the completion phase of the DAPS HO does not exceed the capabilities of the UE related to PDCP duplication, e.g., the maximum number of configured or activated RLC entities per duplicated RB the UE supports.

7. The method of claim 1, wherein the indication of the capability of the UE related to PDCP duplication indicates at least one of:
   whether the UE supports PDCP duplication for a data radio bearer (DRB), a signaling radio bearer (SRB), or both; or
   whether the UE supports PDCP duplication for a split SRB or DRB.

8. The method of claim 1, wherein the target node is limited to deconfiguring or deactivating a radio link control (RLC) entity for a duplicated radio bearer during the completion phase of the DAPS HO.

9. The method of claim 1, wherein, if the UE transmits medium access control (MAC) control elements (CEs) providing dynamic updates of configured and activated radio link control (RLC) entities, then the target has flexibility to modify the configuration and activation status of RLC entities of a duplicated radio bearer during the completion phase of the DAPS HO.

10. The method of claim 1, wherein the target node is not allowed to modify the configuration or activation status of radio link control (RLC) entities for a duplicated radio bearer during the completion phase of the DAPS HO.

11. The method of claim 1, wherein:
    the target node comprises a master node (MN) of a target master cell group (MCG) and coordinates with at least one secondary node (SN) of a secondary cell group (SCG) for the PDCP duplication configuration of one or more RBs.

12. The method of claim 11, wherein:
    the coordination comprises sending an SN addition request to reserve resources for at least one of: secondary cell group (SCG) bearers, MN terminated split bearers, or SN terminated split bearers, wherein the SN addition request indicates the capability of the UE related to PDCP duplication, current source MCG and source SCG PDCP duplication configurations of the UE;
    the MN determines a PDCP duplication configuration for SN terminated split bearers based on a response to the SN addition request in an SN addition request acknowledge message; and
    the MN determines a PDCP duplication configuration for MCG and MN terminated split bearers, whereas a target SN determines the configuration for SCG bearers and SN terminated split bearers.

13. The method of claim 1, wherein:
    the HO request message contains a source UE radio configuration that indicates a mapping of logical channels associated with RLC entities of radio bearers to transmitter receiver points (TRPs), wherein the mapping is designed to ensure that different logical channels are mapped to different TRPs.

14. The method of claim 13, wherein:
    the target node also considers multi-TRP transmission and reception capability of the target node and multi-TRP transmission and reception capabilities of the UE when determining the PDCP duplication configuration for the completion phase of the DAPS HO; and
    the PDCP duplication configuration provided by the target node also includes a mapping of logical channels associated with RLC entities of radio bearers to TRPs.

15. A method for wireless communication by a source node, comprising:
    sending, to a target node, a handover (HO) request message for a dual active protocol stack (DAPS) HO of a user equipment (UE) from the source node to the target node;
    receiving, from the target node, a response to the HO request message that includes a packet data convergence protocol (PDCP) duplication configuration for a completion phase of the DAPS HO that takes into account one or more capabilities of the UE related to packet data convergence protocol (PDCP) duplication and a current PDCP duplication configuration of the UE; and sending the UE a reconfiguration message including an indication of the PDCP duplication configuration for the completion phase of the DAPS HO as received from the target node.

16. The method of claim 15, further comprising sending the target node an indication of the capability of the UE related to PDCP duplication and the current PDCP duplication configuration of the UE.

17. The method of claim 16, wherein the HO request message includes the indication of the capability of the UE related to PDCP duplication and the current PDCP duplication configuration of the UE.

18. The method of claim 15, wherein the capability of the UE related to PDCP duplication comprises at least one of:
    a maximum number of duplicated radio bearers (RBs) the UE supports; or
    a maximum number of activated radio link control (RLC) entities per duplicated RB the UE supports.

19. The method of claim 18, wherein:
    the indication of the current PDCP duplication configuration of the UE indicates RLC entities that are currently configured and activated for each duplicated RB during a preparation phase of the DAPS HO.

20. The method of claim 18, wherein the indication of the capability of the UE related to PDCP duplication indicates at least one of:
    whether the UE supports PDCP duplication for a data radio bearer (DRB), a signaling radio bearer (SRB), or both; or
    whether the UE supports PDCP duplication for a split SRB or DRB.

21. The method of claim 20, wherein:
    the target node comprises a master node (MN) of a target master cell group (MCG) and coordinates with at least one secondary node (SN) for the PDCP duplication configuration of one or more RBs.

22. The method of claim 15, wherein:
    the HO request message contains a source UE radio configuration that indicates a mapping of logical channels associated with RLC entities of radio bearers to transmitter receiver points (TRPs), wherein the mapping is designed to ensure that different logical channels are mapped to different TRPs.

23. A method for wireless communication by a user equipment (UE), comprising:
    providing an indication of UE capabilities related to packet data convergence protocol (PDCP) duplication;
    receiving, from a source node, a reconfiguration message for a dual active protocol stack (DAPS) handover (HO) of the UE from the source node to a target node, wherein the reconfiguration message indicates a packet data convergence protocol (PDCP) duplication configuration for a completion phase of the DAPS HO that takes into account one or more capabilities of the UE related to the PDCP duplication and a current PDCP duplication configuration of the UE; and
    performing a HO to the target node based on the PDCP duplication configuration for the completion phase of the DAPS HO included in the reconfiguration message.

24. The method of claim 23, wherein the capability of the UE related to PDCP duplication comprises at least one of:
    a maximum number of duplicated radio bearers (RBs) the UE supports; or
    a maximum number of activated radio link control (RLC) entities per duplicated RB the UE supports.

25. The method of claim 24, wherein the indication of the capability of the UE related to PDCP duplication indicates at least one of:
    whether the UE supports PDCP duplication by a data radio bearer (DRB), a signaling radio bearer (SRB), or both; or
    whether the UE supports PDCP duplication by a split SRB or DRB.

26. The method of claim 25, wherein:
    the target node comprises a master node (MN) of a target master cell group (MCG); and
    the PDCP duplication configuration for the completion phase of the DAPS HO includes target MCG and target secondary cell group (SCG) PDCP duplication configurations.

27. The method of claim 23, further comprising:
    receiving a source UE radio configuration that indicates a mapping of logical channels associated with RLC entities of radio bearers to transmitter receiver points (TRPs), wherein
    the mapping is designed to ensure that different logical channels are mapped to different TRPs.

28. An apparatus for wireless communication, comprising:
    at least one processor and a memory configured to:
        provide an indication of capabilities of a UE related to packet data convergence protocol (PDCP) duplication;
        receive, from a source node, a reconfiguration message for a dual active protocol stack (DAPS) handover (HO) of the UE from the source node to a target node, wherein the reconfiguration message indicates a packet data convergence protocol (PDCP) duplication configuration for a completion phase of the DAPS HO that takes into account one or more capabilities of the UE related to PDCP duplication and a current PDCP duplication configuration of the UE; and
        perform a HO to the target node based on the PDCP duplication configuration for the completion phase of the DAPS HO included in the reconfiguration message.

29. The apparatus of claim 28, wherein the capability of the UE related to PDCP duplication comprises at least one of:
    a maximum number of duplicated radio bearers (RBs) the UE supports; or
    a maximum number of activated radio link control (RLC) entities per duplicated RB the UE supports.

30. The apparatus of claim 28, wherein the indication of the capability of the UE related to PDCP duplication indicates at least one of:
    whether the UE supports PDCP duplication by a data radio bearer (DRB), a signaling radio bearer (SRB), or both; or
    whether the UE supports PDCP duplication by a split SRB or DRB.

* * * * *